(12) United States Patent
Chen et al.

(10) Patent No.: US 12,619,117 B2
(45) Date of Patent: May 5, 2026

(54) ELECTROCHROMIC DIMMING STRUCTURE AND TRANSPORTATION APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Jiangbo Chen, Beijing (CN); Yafei Zhang, Beijing (CN); Ji Peng, Beijing (CN); Fanli Meng, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 284 days.

(21) Appl. No.: 18/562,474

(22) PCT Filed: Feb. 28, 2023

(86) PCT No.: PCT/CN2023/078832
§ 371 (c)(1),
(2) Date: Nov. 20, 2023

(87) PCT Pub. No.: WO2024/178639
PCT Pub. Date: Sep. 6, 2024

(65) Prior Publication Data
US 2025/0085601 A1       Mar. 13, 2025

(51) Int. Cl.
*G02F 1/157* (2006.01)
*G02F 1/155* (2006.01)

(52) U.S. Cl.
CPC .............. *G02F 1/157* (2013.01); *G02F 1/155* (2013.01)

(58) Field of Classification Search
CPC ................................. G02F 1/157; G02F 1/155
See application file for complete search history.

(56) References Cited

U.S. PATENT DOCUMENTS

2013/0010347 A1* 1/2013 Tajima ................... C03C 17/36
                                                               359/267
2017/0329197 A1  11/2017 Yashiro et al.
(Continued)

FOREIGN PATENT DOCUMENTS

CN      107111196 A      8/2017
CN      107111197 A      8/2017
(Continued)

*Primary Examiner* — James A Dudek
(74) *Attorney, Agent, or Firm* — LEASON ELLIS LLP

(57) ABSTRACT

An electrochromic dimming structure and a transportation apparatus are provided. The electrochromic dimming structure includes a substrate, an electrochromic device and a first protective layer. The electrochromic device includes a first electrode layer, an electrochromic layer and a second electrode layer, the first electrode layer is located between the electrochromic layer and the substrate, the first electrode layer and the second electrode layer are full-layer transparent electrode layers, and at least one of the first electrode layer or the second electrode layer includes an oxide material. The electrochromic device further includes a metal electrode located at at least one of a side of the first electrode layer away from the second electrode layer or a side of the second electrode layer away from the first electrode layer, and the metal electrode is electrically connected with at least one of the first electrode layer or the second electrode layer.

20 Claims, 12 Drawing Sheets

(56)     References Cited

U.S. PATENT DOCUMENTS

| | | | |
|---|---|---|---|
| 2017/0357135 | A1 | 12/2017 | Gillaspie et al. |
| 2019/0212625 | A1 | 7/2019 | Lee et al. |
| 2021/0088865 | A1* | 3/2021 | Ko ..................... G02F 1/1524 |
| 2021/0410239 | A1 | 12/2021 | Chang |
| 2022/0100045 | A1 | 3/2022 | Fukushi et al. |
| 2023/0418126 | A1 | 12/2023 | Su |

FOREIGN PATENT DOCUMENTS

| | | | |
|---|---|---|---|
| CN | 107621737 | A | 1/2018 |
| CN | 108776405 | B | 11/2018 |
| CN | 109154755 | A | 1/2019 |
| CN | 208766430 | U | 4/2019 |
| CN | 208937879 | U | 6/2019 |
| CN | 110510890 | B | 11/2019 |
| CN | 112083586 | A | 12/2020 |
| CN | 212484030 | U | 2/2021 |
| CN | 112835238 | A | 5/2021 |
| CN | 113467649 | A | 10/2021 |
| CN | 214335428 | U | 10/2021 |
| CN | 114326240 | A | 4/2022 |
| CN | 218181283 | U | 12/2022 |

* cited by examiner

242

241/240

A ← → A'

242

241/240

28GHz radiation direction view

28GHz radiation direction view

ELECTROCHROMIC DIMMING STRUCTURE AND TRANSPORTATION APPARATUS

CROSS-REFERENCE TO RELATED PATENT APPLICATIONS

This application is a U.S. National Stage Application under 35 U.S.C. § 371 of International Patent Application No. PCT/CN2023/078832, filed Feb. 28, 2023, which is incorporated by reference in its entirety.

TECHNICAL FIELD

Embodiments of the present disclosure relate to an electrochromic dimming structure and a transportation apparatus.

BACKGROUND

At present, electrochromic glass is widely used in fields, such as automotive glass, aviation glass, and building materials, etc. Electrochromism is a phenomenon that the optical properties of materials (such as reflectivity, transmittance, absorptivity, etc.) change stably and reversibly under the action of an external electric field, which is manifested as reversible changes in color and transparency in appearance. Materials with electrochromic properties are called electrochromic materials, and devices made of electrochromic materials are called electrochromic devices.

SUMMARY

Embodiments of the present disclosure relates to an electrochromic dimming structure and a transportation apparatus. The electrochromic dimming structure includes: a substrate, an electrochromic device and a first protective layer. The electrochromic device is located on the substrate, the electrochromic device includes a first electrode layer, an electrochromic layer and a second electrode layer which are sequentially stacked, the first electrode layer is located between the electrochromic layer and the substrate, both the first electrode layer and the second electrode layer are full-layer transparent electrode layers, and at least one of the first electrode layer or the second electrode layer includes an oxide material; the first protective layer covers the electrochromic device; The electrochromic device further includes a metal electrode located at at least one of a side of the first electrode layer away from the second electrode layer or a side of the second electrode layer away from the first electrode layer, and the metal electrode is electrically connected with at least one of the first electrode layer or the second electrode layer.

For example, according to an embodiment of the present disclosure, the metal electrode includes at least one of a metal grid electrode or a metal thin layer, and a thickness of the metal thin layer is in a range of 1-20 nanometers; and the metal electrode overlaps with the electrochromic layer in a direction perpendicular to the substrate.

For example, according to an embodiment of the present disclosure, the electrochromic dimming structure further includes: an antenna structure, disposed in the same layer as and separated from at least part of the metal electrode.

For example, according to an embodiment of the present disclosure, the metal electrode includes a first metal electrode and a second metal electrode, the first metal electrode is located at the side of the first electrode layer away from the second electrode layer and is electrically connected with the first electrode layer, and the second metal electrode is located at the side of the second electrode layer away from the first electrode layer and is electrically connected with the second electrode layer; the antenna structure is disposed in the same layer as the first metal electrode, and a thickness of the antenna structure is greater than a thickness of the second metal electrode.

For example, according to an embodiment of the present disclosure, the first metal electrode includes a first metal grid electrode or a first metal thin layer, and the second metal electrode includes a second metal thin layer.

For example, according to an embodiment of the present disclosure, the metal grid electrode includes a first metal grid electrode and a second metal grid electrode, the first metal grid electrode is located at the side of the first electrode layer away from the second electrode layer and is electrically connected with the first electrode layer, and the second metal grid electrode is located at the side of the second electrode layer away from the first electrode layer and is electrically connected with the second electrode layer; an overlapping ratio of an orthographic projection of the first metal grid electrode on the substrate to an orthographic projection of the second metal grid electrode on the substrate is greater than 90%; and the antenna structure is disposed in the same layer as one of the first metal grid electrode and the second metal grid electrode.

For example, according to an embodiment of the present disclosure, at least 90% of an orthographic projection of the first electrode layer on the substrate overlaps with an orthographic projection of the metal thin layer on the substrate; the metal thin layer includes a first metal thin layer and a second metal thin layer, the first metal thin layer is located at the side of the first electrode layer away from the second electrode layer and is electrically connected with the first electrode layer, and the second metal thin layer is located at the side of the second electrode layer away from the first electrode layer and is electrically connected with the second electrode layer; and the antenna structure is disposed in the same layer as one of the first metal thin layer and the second metal thin layer.

For example, according to an embodiment of the present disclosure, the antenna structure includes a solid structure, and the antenna structure does not overlap with the electrochromic layer in the direction perpendicular to the substrate.

For example, according to an embodiment of the present disclosure, the antenna structure includes a grid structure, and the antenna structure overlaps or does not overlap with the electrochromic layer in the direction perpendicular to the substrate.

For example, according to an embodiment of the present disclosure, the antenna structure includes a main body portion, a shape of the main body portion is an octagon, and an included angle between at least two adjacent sides of the octagon is 135 degrees.

For example, according to an embodiment of the present disclosure, the antenna structure includes a main body portion, the main body portion includes the grid structure, the grid structure includes a first strip portion extending along a first direction and a second strip portion extending along a second direction, and the first direction intersects with the second direction.

For example, according to an embodiment of the present disclosure, the antenna structure includes a main body portion, the main body portion includes the grid structure, and the grid structure includes a plurality of strip portions radially arranged starting from a point in a central region of the main body portion.

For example, according to an embodiment of the present disclosure, a thickness of an electrode layer electrically connected with the metal electrode in the first electrode layer and the second electrode layer is in a range of 10 nm to 10 microns.

For example, according to an embodiment of the present disclosure, a thickness of the metal grid electrode is in a range of 100-5000 nanometers, and a line width of the metal grid electrode is in a range of 1-5 microns.

For example, according to an embodiment of the present disclosure, the electrochromic dimming structure further includes: a second protective layer, covering the second electrode layer. At least part of the second metal grid electrode and the antenna structure are located at one side of the second protective layer away from the substrate, the second protective layer includes a groove configured to expose the second electrode layer, and the second metal grid electrode is electrically connected with the second electrode layer through the groove; an electrode portion is further disposed at one side of the second protective layer away from the second electrode layer, and the electrode portion is electrically connected with the second metal grid electrode; and the first protective layer covers the second metal grid electrode and the antenna structure.

For example, according to an embodiment of the present disclosure, the antenna structure is disposed in the same layer as the first metal grid electrode, and the first protective layer covers the antenna structure; the first metal grid electrode includes two metal layers, and a material of the antenna structure is the same as a material of one metal layer away from the substrate in the two metal layers.

For example, according to an embodiment of the present disclosure, the second electrode layer includes a first film layer, a second film layer and a third film layer which are stacked, a material of the first film layer is the same as a material of the third film layer, a thickness ratio of the first film layer to the third film layer is in a range of 0.9-1.1, and a thickness of the second film layer is less than a thickness of the first film layer.

For example, according to an embodiment of the present disclosure, the electrochromic layer includes an electrochromic material layer, an electrolyte layer and a storage layer which are sequentially stacked, and the electrochromic material layer is located between the electrolyte layer and the first electrode layer.

For example, according to an embodiment of the present disclosure, the electrochromic material layer includes one of an inorganic electrochromic material and an organic electrochromic material, and the electrolyte layer includes one of a solid electrolyte and a liquid electrolyte.

An embodiment of the present disclosure provides a transportation apparatus, including a sunroof, the sunroof includes the electrochromic dimming structure as mentioned above.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. In the embodiment of the present disclosure, the features, "parallel to," "perpendicular to," "identical to," etc., all include the features "parallel to," "perpendicular to," "identical to," etc., in the strict sense, as well as the cases containing certain errors, such as "approximately parallel to," "approximately perpendicular to," "approximately identical to," etc. Considering the measurement and the errors related to the measurement of a specific quantity (e.g., the limitation of the measurement system), they are within an acceptable deviation range for the specific quantity determined by those skilled in the art. For example, the term "approximately" can mean within one or more standard deviations, or within 10% or 5% deviation of the stated value. When the quantity of a component is not specified in the following description of the embodiments of the present disclosure, it means that the number of the components can be one or more, or can be understood as at least one. The phrase "at least one" means one or more, and the phrase "plurality of" means at least two. The feature "in the same layer" in the present disclosure refers to that two (or more than two) structures are formed by patterning through a same deposition process and a same patterning process, and they can have the same or different materials.

Figure 1:
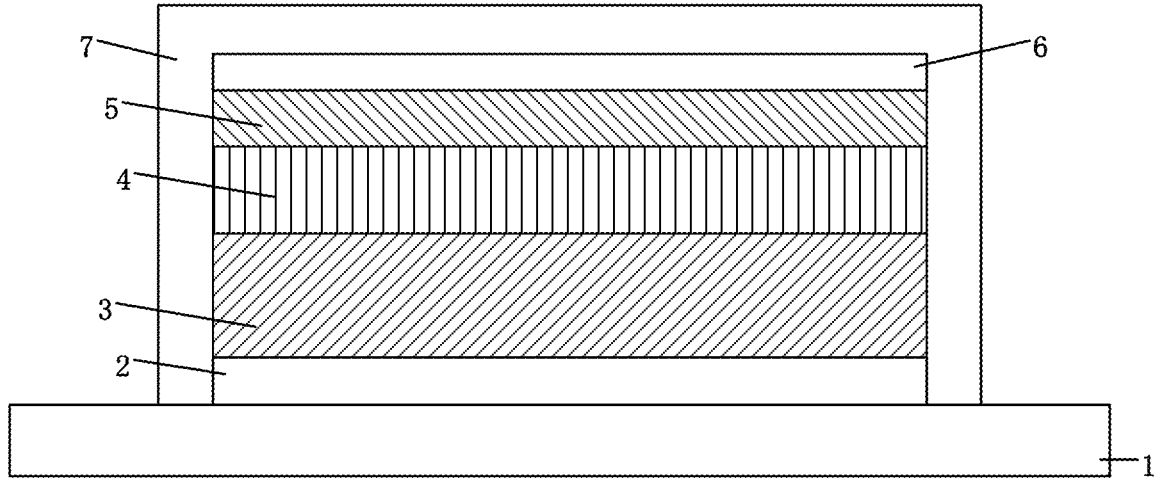
FIG. 1 shows an electrochromic dimming structure.

FIG. 1 shows an electrochromic dimming structure. As shown in FIG. 1, the electrochromic dimming structure includes a glass 1, an electrochromic device and a protective layer 7 covering the electrochromic device. The electrochromic device includes a lower electrode 2, a color-changing layer 3, an electrolyte layer 4, an ion storage layer 5 and an upper electrode 6 which are sequentially stacked. Both the lower electrode 2 and the upper electrode 6 are full-layer transparent conductive films in the electrochromic device, and for example, they are made of indium tin oxide (ITO). The color-changing layer is the core layer of the electrochromic device and the generation layer of color-changing reaction. The materials of the color-changing layer can be divided into inorganic electrochromic materials and organic electrochromic materials according to their types.

As a new economic growth point, new energy vehicles have attracted much attention, and the issue of battery cruising range has become the main factor restricting the design of interior space. It is difficult for mechanical sunroof or mechanical panoramic sunroof to be widely used in new energy vehicles. As a result, the color-changing canopy is gradually being applied to new energy vehicles.

At present, Electrochromic (EC) technology, polymer dispersed liquid crystals (PDLC) technology and suspended particle devices (SPD) technology are mainly used in the color-changing canopy. The above PDLC and SPD belong to physical dimming and EC belongs to electrochemical dimming. PDLC canopy mainly changes the arrangement of liquid crystal molecules in glass to switch between transparent state and atomized state. For example, after the power is cut off, ordinary PDLC glass will immediately turn into an atomized state, and will not always maintain a high light transmission state; and the thermal insulation performance will be worse. SPD canopy means that suspended particles are added to the glass interlayer, and Brownian motion particles are randomly arranged when power is cut off, which can absorb more than 99% visible light; this canopy consumes a lot of power, requires a 110V voltage for driving, will return to dark state when power is cut off, has a maximum operating temperature of 60° C. and a higher cost. The principle of EC technology is that ions pass through the electrolyte layer, enter the electrochromic layer, and chemically react with the substances in the electrochromic layer, so the color of glass will change.

In research, the inventor(s) of the present application have noticed: in the case where the color-changing canopy includes the electrochromic dimming structure shown in FIG. 1, because at least one of the upper electrode or the lower electrode of the electrochromic dimming structure adopts indium tin oxide (ITO) and a square resistance thereof is 50 ohms/square, the color-changing speed of the dimming screen using the electrochromic dimming structure is slow, and for example, it takes several minutes to adjust the dimming screen from high transmittance to low transmittance; moreover, the larger the area of the dimming screen, the slower the color-changing speed of the dimming screen, thus greatly reducing the experience of changing the color of the color-changing canopy.

The present disclosure provides an electrochromic dimming structure and a transportation apparatus. The electrochromic dimming structure includes a substrate, an electrochromic device and a first protective layer. The electrochromic device is located on the substrate, the electrochromic device includes a first electrode layer, an electrochromic layer and a second electrode layer which are sequentially stacked, the first electrode layer is located between the electrochromic layer and the substrate, both the first electrode layer and the second electrode layer are full-layer transparent electrode layers, and at least one of the first electrode layer or the second electrode layer includes an oxide material; and the first protective layer covers the electrochromic device. The electrochromic device further includes a metal electrode located at at least one of a side of the first electrode layer away from the second electrode layer or a side of the second electrode layer away from the first electrode layer, and the metal electrode is electrically connected with at least one of the first electrode layer or the second electrode layer.

In the electrochromic dimming structure provided by the present disclosure, by setting the metal electrode electrically connected with at least one of the first electrode layer or the second electrode layer, the overall square resistance of at least one of the first electrode layer or the second electrode layer is greatly reduced, the electrochromic speed and the color-change uniformity of the large-area electrochromic dimming structure are effectively improved; and in the case where the electrochromic dimming structure is applied to a color-changing canopy, the experience effect of the color-changing canopy is favorably improved.

Hereinafter, the electrochromic dimming structure and the transportation apparatus provided by the present disclosure will be described with reference to the accompanying drawings.

Figure 2:
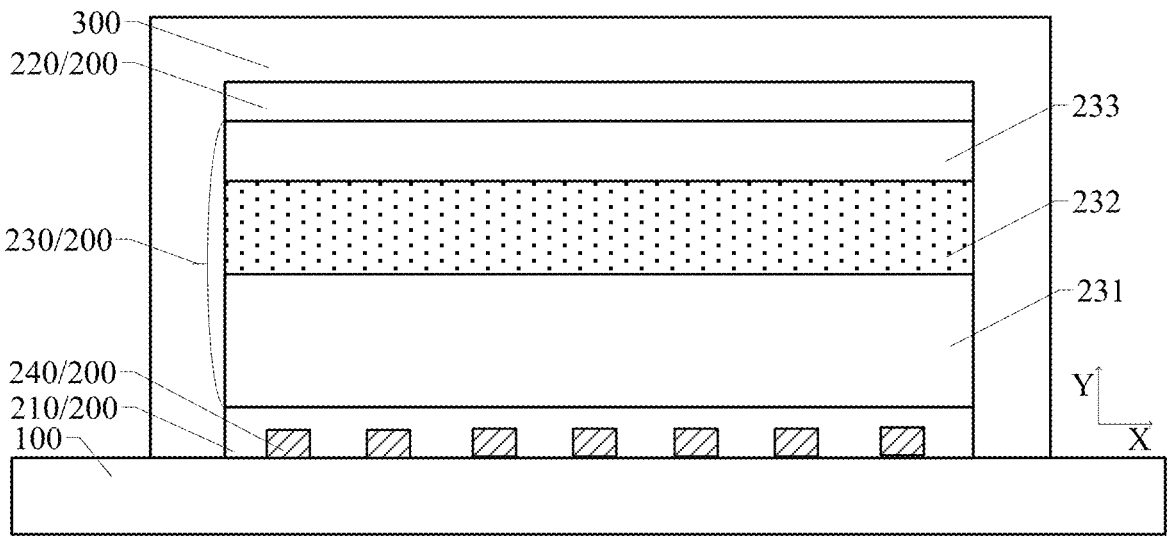
FIG. 2 is a partial structural view of an electrochromic dimming structure provided by an example of the embodiment of the present disclosure.

FIG. 2 is a partial structural view of an electrochromic dimming structure provided by an example of the embodiment of the present disclosure. As shown in FIG. 2, the electrochromic dimming structure includes a substrate 100, an electrochromic device 200 and a first protective layer 300.

For example, as shown in FIG. 2, the substrate 100 can include a light-transmitting material, such as glass, etc.

As shown in FIG. 2, the electrochromic device 200 is located on the substrate 100. The electrochromic device 200 includes a first electrode layer 210, an electrochromic layer 230 and a second electrode layer 220 which are sequentially stacked. The first electrode layer 210 is located between the electrochromic layer 230 and the substrate 100, both the first electrode layer 210 and the second electrode layer 220 are full-layer transparent electrode layers, and at least one of the first electrode layer 210 or the second electrode layer 220 includes an oxide material.

For example, the material of the first electrode layer 210 can include indium tin oxide (ITO), fluorine-doped tin dioxide (FTO), etc. For example, the material of the second electrode layer 220 can be the same as the material of the first electrode layer 210. For example, the thickness of the first electrode layer 210 and the thickness of the second electrode layer 220 can be in the range of 10 nanometers to 10 microns. For example, the thickness of the first electrode layer 210 and the thickness of the second electrode layer 220 can be in the range of 15-800 nanometers. For example, the thickness of the first electrode layer 210 and the thickness of the second electrode layer 220 can be in the range of 20-500 nanometers. For example, the thickness of the first electrode layer 210 and the thickness of the second electrode layer 220 can be in the range of 25-400 nanometers. For example, the thickness of the first electrode layer 210 and the thickness of the second electrode layer 220 can be in the range of 30-300 nanometers. For example, the thickness of the first electrode layer 210 and the thickness of the second electrode layer 220 can be in the range of 40-200 nanometers. For example, the thickness of the first electrode layer 210 and the thickness of the second electrode layer 220 can be in the range of 50-100 nanometers. For example, the thickness of the first electrode layer 210 and the thickness of the second electrode layer 220 can be in the range of 60-90 nanometers. In the case where the first electrode layer and the second electrode layer are made of oxide materials, it is helpful to minimize the influence of the first electrode layer and the second electrode layer on the electrochromic layer.

For example, the first electrode layer 210 and the second electrode layer 220 can also adopt thin metal layers, and the thickness of the thin metal layer can be less than 50 nanometers. For example, the material of the thin metal layer can include gold (Au), copper (Cu), silver (Ag), nickel (Ni), chromium (Cr), molybdenum (Mo), aluminum (Al) etc.

In some examples, as shown in FIG. 2, the electrochromic layer 230 includes an electrochromic material layer 231, an electrolyte layer 232 and a storage layer 233 which are sequentially stacked, and the electrochromic material layer 231 is located between the electrolyte layer 232 and the first electrode layer 210. For example, the electrochromic material layer 231 can be made of a cathode color-changing material, and the storage layer 233 can be made of an anode color-changing material.

In some examples, as shown in FIG. 2, the material of the electrochromic material layer 231 can include an inorganic electrochromic material and/or an organic electrochromic material.

For example, the organic electrochromic material includes polyaniline and its derivatives, polypyrrole and its derivatives, polythiophene and its derivatives, viologen, tetrathiafulvalene, metal phthalocyanine compounds, etc.

For example, the inorganic electrochromic material includes tungsten trioxide ($WO_3$), titanium dioxide ($TiO_2$), niobium pentoxide ($Nb_2O_5$), molybdenum trioxide ($MoO_3$), tantalum pentoxide ($Ta_2O_5$), etc. For example, in the case where the electrochromic material layer 231 is made of tungsten trioxide ($WO_3$), its electrochromic mechanism can be the injection and extraction of electrons and ions.

For example, tungsten trioxide ($WO_3$) can be prepared by reactive sputtering, during which the flow ratio of argon (Ar)

and oxygen ($O_2$) can be 1:1 and the operation power can be 100 W, and the thickness of the prepared electrochromic material layer 231 can be 300 nanometers.

In some examples, as shown in FIG. 2, the material of the electrolyte layer 232 includes at least one selected from the group consisting of all-solid polymer electrolyte, gel polymer electrolyte and composite polymer electrolyte. For example, many kinds of macromolecule polymer materials are used in the preparation of the polymer electrolyte, among which the most representative polymer electrolyte matrix materials are polyether (mainly PEO), polyacrylonitrile (PAN), polyvinylidene fluoride (PVdF) and polymethyl methacrylate (PMMA).

For example, solid electrolyte includes lithium phosphorus oxynitride (LiPON), lithium phosphorus silicon oxynitride (LiSiPON), lithium lanthanum zirconium oxide (LLZO), lithium lanthanum titanium oxide (LLTO), tantalum doped lithium lanthanum zirconium oxide (LLZTO), lithium polymer (LiPO), tantalum pentoxide ($Ta_2O_5$), lithium niobate ($LiNbO_3$), lithium tantalate ($LiTaO_3$), silicon oxide ($SiO_2$), etc.

For example, nitrogen ($N_2$) can be introduced in the process of preparing lithium phosphorus oxynitride (LiPON), the volume flow rate of nitrogen ($N_2$) is 60 sccm, the operation power can be 100 W, and the thickness of the formed electrolyte layer can be 300 nanometers.

For example, the material of the storage layer 233 includes nickel oxide (NiO), iridium oxide ($IrO_2$), manganese dioxide ($MnO_2$), cobalt tetroxide ($CO_3O_4$), etc. For example, the storage layer 233 can be called a counter electrode. For example, the storage layer 233 can function to store ions and balance charges.

For example, nickel oxide (NiO) can be prepared by reactive sputtering, during which the flow ratio of argon (Ar) and oxygen ($O_2$) can be 8:1 and the operation power can be 100 W, and the thickness of the prepared electrochromic material layer 231 can be 300 nanometers.

For example, the electrochromic material layer 231 and the storage layer 233 can be prepared by sol-gel method, screen printing, blade coating, slit coating method, pouring method, etc., so as to form colloidal film layers.

For example, according to the coloring method, inorganic electrochromic materials can be divided into cathode coloring materials and anode coloring materials. For example, oxides containing tungsten (W), molybdenum (Mo), niobium (Nb), tantalum (Ta), titanium (Ti), etc., belong to cathode coloring materials. Anode electrochromic materials are mainly group VIII transition metal oxides, such as oxides containing nickel (Ni), cobalt (Co), manganese (Mn), iridium (Ir), etc., and their hydrated oxides, which are faded when reduced and colored when oxidized. Prussian blue system also belongs to anode coloring materials. Materials that exhibit dual coloration, i.e., have colors in both oxidized and reduced states, such as vanadium pentoxide ($V_2O_5$), rhodium oxide ($Rh_2O_3$), and CoOx, also belong to anode coloring materials.

For example, as shown in FIG. 2, a surface of the first electrode layer 210 is in contact with a surface of the electrochromic material layer 231, a surface of the electrochromic material layer 231 is in contact with a surface of the electrolyte layer 232, a surface of the electrolyte layer 232 is in contact with a surface of the storage layer 233, and a surface of the storage layer 233 is in contact with a surface of the second electrode layer 220. In the case where a voltage is applied to the first electrode layer 210 and the second electrode layer 220 to generate a voltage difference, ions in the storage layer 233 enter the electrochromic material layer 231 through the electrolyte layer 232, and chemically react with substances in the electrochromic material layer 231, so that the color of the electrochromic material layer 231 changes and the transparency is reduced; in the case where there is no voltage difference between the first electrode layer 210 and the second electrode layer 220, ions are extracted from the electrochromic material layer 231 and returned to the storage layer, and the electrochromic material layer 231 returns to a transparent state.

As shown in FIG. 2, in the electrochromic dimming structure, the first protective layer 300 covers the electrochromic device 200. For example, the first protective layer 300 covers a surface of the electrochromic device 200 away from the substrate 100 and a side surface of the electrochromic device 200, and the first protective layer 300 wraps the electrochromic device 200 to protect it.

For example, the first protective layer 300 can be made of one layer or a stack of lithium phosphorus oxynitride (LiPON), polydimethylsiloxane (PDMS), silicon nitride (SiN), silicon oxynitride (SiON), silicon oxide (SiO), etc.

As shown in FIG. 2, the electrochromic device 200 further includes a metal electrode 240 located at at least one of a side of the first electrode layer 210 away from the second electrode layer 220 or a side of the second electrode layer 220 away from the first electrode layer 210, and the metal electrode 240 is electrically connected with at least one of the first electrode layer 210 or the second electrode layer 220.

In some examples, as shown in FIG. 2, the thickness of an electrode layer, in the first electrode layer 210 and the second electrode layer 220, electrically connected with the metal electrode 240 is not greater than 100 nanometers. For example, the thickness of this electrode layer is not greater than 90 nanometers. For example, the thickness of this electrode layer is not greater than 80 nanometers.

In the electrochromic dimming structure provided by the present disclosure, by setting the metal electrode electrically connected with at least one of the first electrode layer or the second electrode layer in the electrochromic device, the resistance of a whole electrode formed of the metal electrode with the first electrode layer and/or the second electrode layer can be greatly reduced, and the electrochromic speed of the large-area electrochromic dimming structure can be effectively improved; therefore, in the case where the electrochromic dimming structure is applied to a color-changing canopy, the experience effect of the color-changing canopy can be improved.

In addition, by setting the oxide electrode layer and the metal electrode together as the electrode of the electrochromic dimming structure, the performance of the electrochromic layer can be prevented from being affected by the direct contact between the metal electrode and the electrochromic layer, and the thickness of the electrode layer can be reduced; therefore, the overall resistance of the electrode of the electrochromic dimming structure is reduced, and the electrochromic dimming structure will not have a larger thickness or the performance of the electrochromic layer is affected due to introducing the metal electrode.

Figure 3:
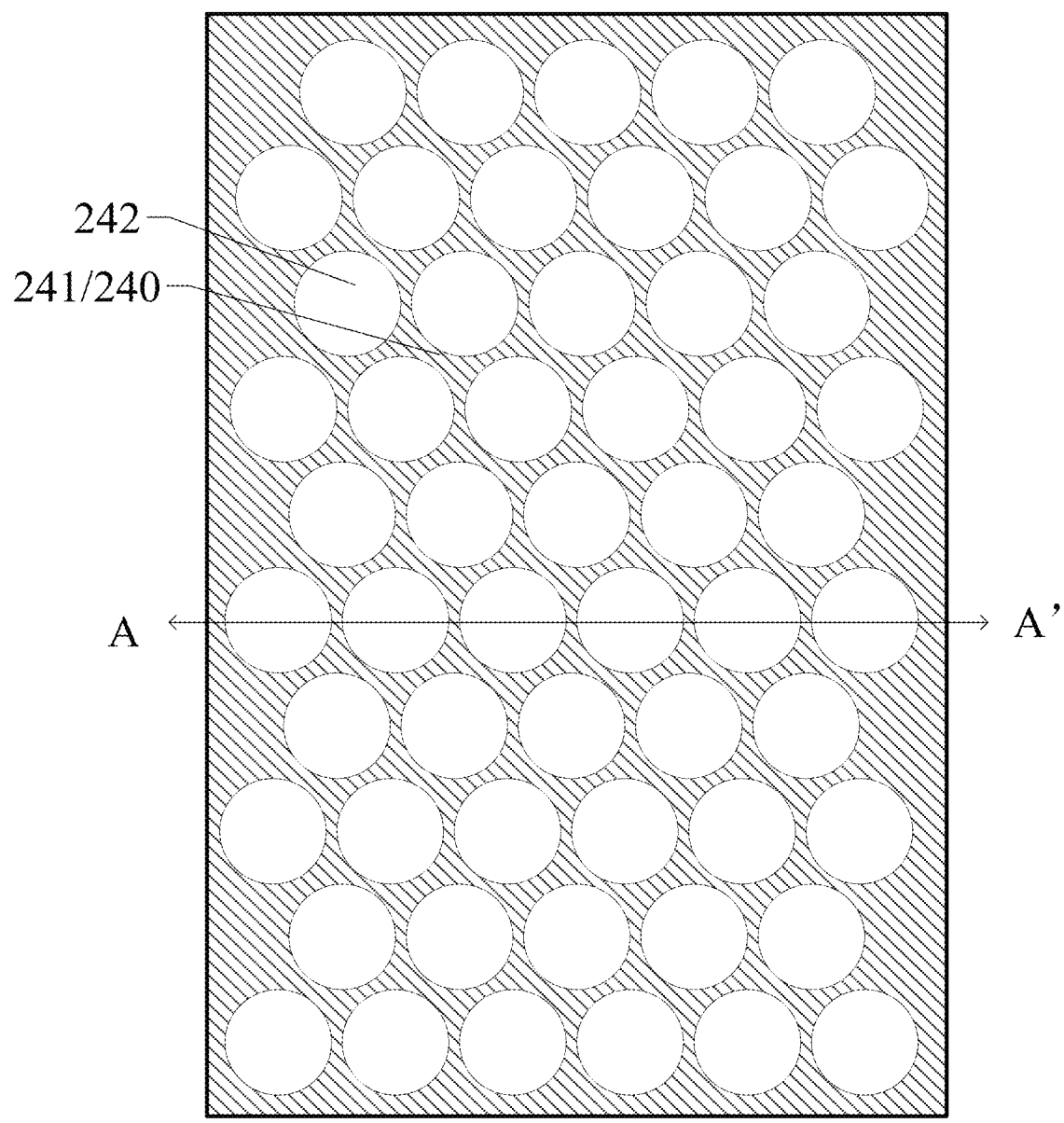
FIGS. 3-5 are planar structural views of metal grid electrodes in different examples.
Figure 4:
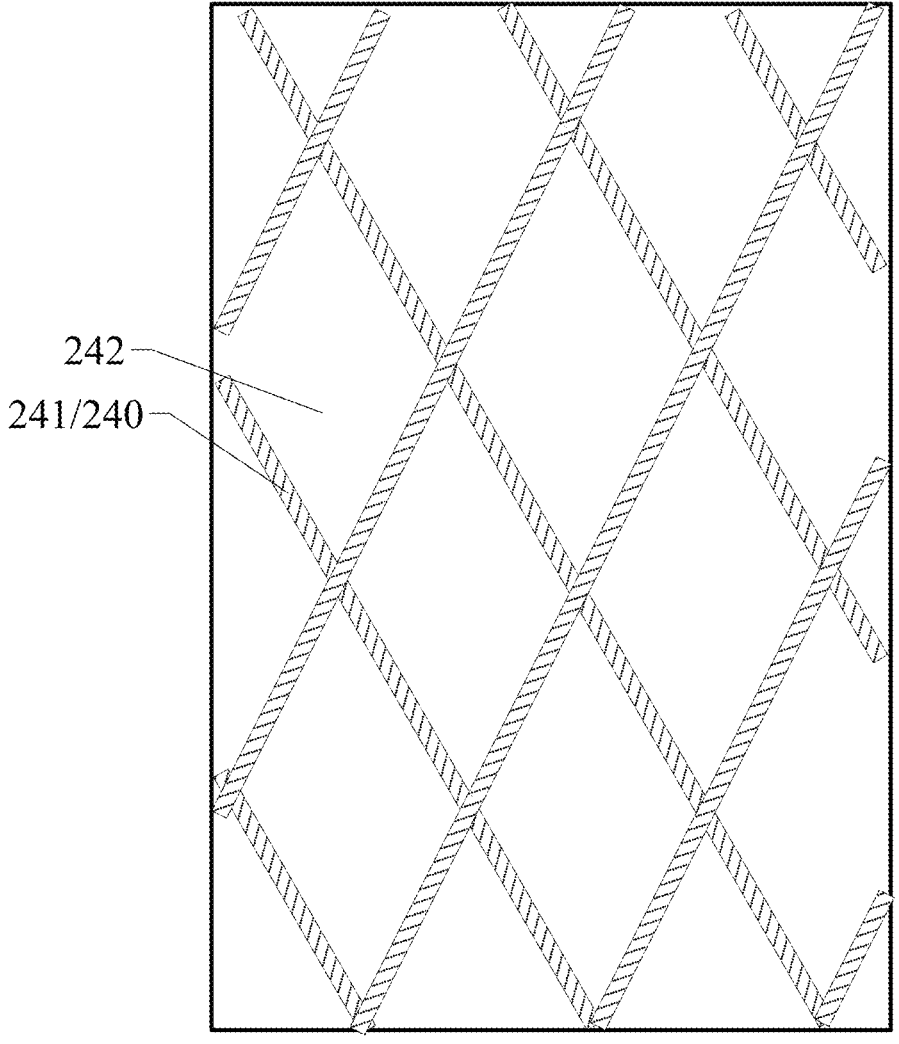
Figure 5:
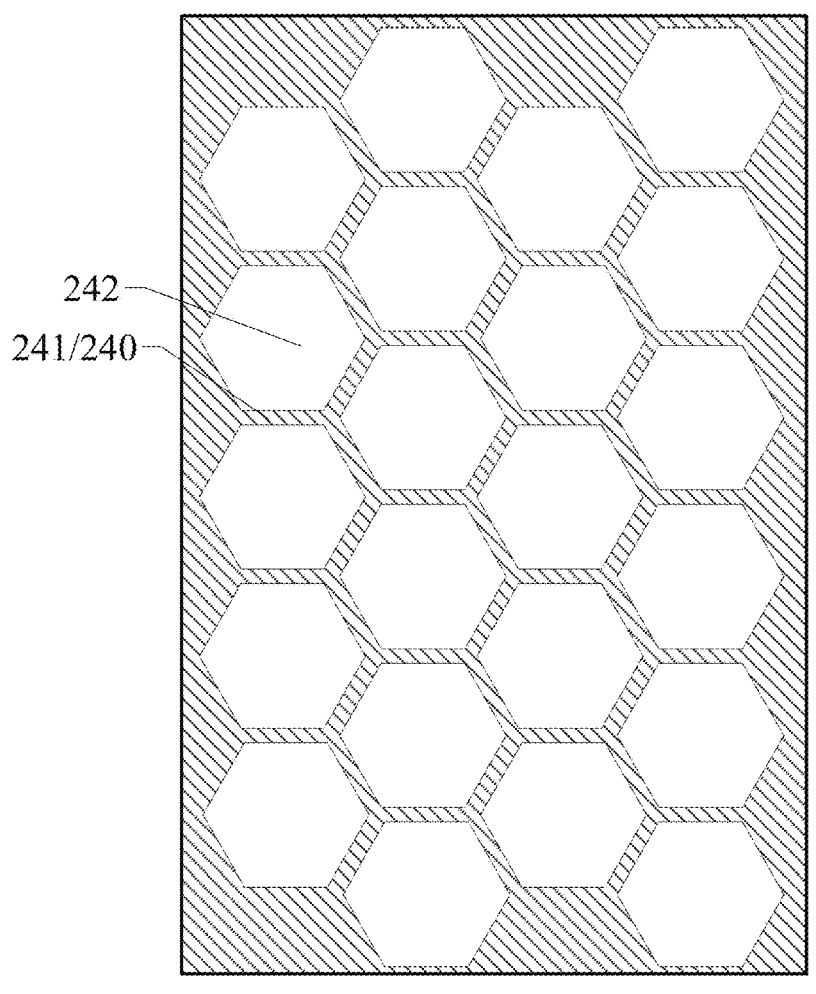

FIGS. 3-5 are planar structural views of metal grid electrodes in different examples.

In some examples, as shown in FIGS. 2-5, the metal electrode 240 includes a metal grid electrode 241, and the metal grid electrode 241 overlaps with the electrochromic layer 230 in a direction perpendicular to the substrate 100 (Y direction as shown in FIG. 2).

For example, the material of the metal grid electrode 241 can be gold (Au), platinum (Pt), copper (Cu), molybdenum (Mo), silver (Ag), aluminum (Al), etc.

For example, as shown in FIGS. 3-5, the metal grid electrode 241 includes hollow regions 242, and the hollow regions 242 can be uniformly arranged. For example, the pattern of the hollow region 242 can include a regular-shaped pattern, such as a polygonal pattern, a circular pattern, an elliptical pattern, etc., and can also include an irregular-shaped pattern, such as a pattern enclosed by a wave shape, etc. For example, polygons can include triangles, quadrilaterals, pentagons, hexagons, octagons and other shapes.

In some examples, as shown in FIGS. 2-5, the thickness of the metal grid electrode 241 is in the range of 100-5000 nanometers, and the line width of the metal grid electrode 241 is in the range of 1-5 microns. For example, the metal grid electrode includes a plurality of strip-shaped electrodes, and the distance between adjacent strip-shaped electrodes is greater than 1 micron. For example, the distance between adjacent strip-shaped electrodes is greater than 2 microns.

For example, in the case where the line width of the metal grid electrode 241 is relatively wide, such as 2-5 microns, the line width will not be comparable to the wavelength, so interference fringes will not be generated. For example, in the case where the line width of the metal grid electrode 241 is relatively narrow, for example, the line width is 1 micron, and in the case where the distance between the metal grid electrodes 241 is large, for example, the distance is greater than 1 micron, no interference will occur.

For example, the thickness of the metal grid electrode 241 is in the range of 150-1000 nanometers. For example, the thickness of the metal grid electrode 241 is in the range of 400-900 nanometers. For example, the thickness of the metal grid electrode 241 is in the range of 400-900 nanometers. For example, the thickness of the metal grid electrode 241 is in the range of 500-800 nanometers. For example, the thickness of the metal grid electrode 241 is in the range of 200-300 nanometers.

For example, the line width of the metal grid electrode 241 is in the range of 1.5-4.5 microns. For example, the line width of the metal grid electrode 241 is in the range of 2.5-3.5 microns. For example, the line width of the metal grid electrode 241 is in the range of 2-3 microns.

In the electrochromic material layer shown in FIG. 1, in the case where the first electrode layer and the second electrode layer are not electrically connected with the metal electrode, both the square resistance of the first electrode layer and the square resistance of the second electrode layer are 50 ohms/square; in the electrochromic dimming structure provided by the present application, at least one of the first electrode layer or the second electrode layer is electrically connected with the metal electrode, for example, forming the electrochromic dimming structure shown in FIG. 2. By setting the metal electrode, the square resistance of the electrode formed by the electrode layer and the metal electrode together can be obviously reduced, for example, not greater than 10 ohms/square, and the electrochromic speed of the large-area electrochromic dimming structure can be effectively improved.

Figure 6:
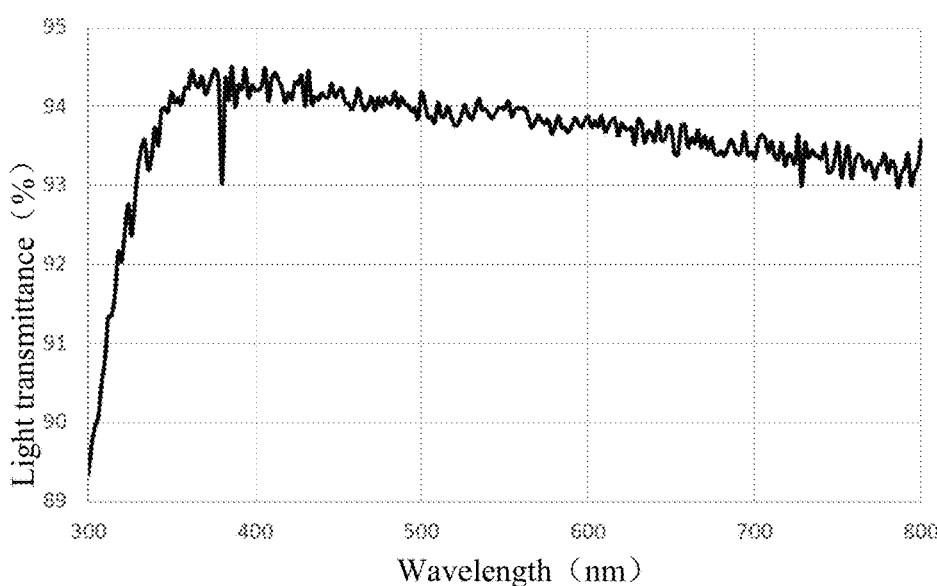
FIG. 6 shows a light transmittance curve when using the metal grid electrode shown in FIG. 4.

FIG. 6 shows a light transmittance curve when using the metal grid electrode shown in FIG. 4. For example, the line width of the metal grid electrode 241 shown in FIG. 4 can be 5 microns. For example, as shown in FIGS. 4 and 6, the transmittance of the metal grid electrode 241 is not less than 90% in the visible light band. For example, the transmittance of the metal grid electrode 241 is not less than 91%. For example, the transmittance of the metal grid electrode 241 is not less than 92%. For example, the transmittance of the metal grid electrode 241 is not less than 93%. For example, the above transmittance refers to the average transmittance of the whole metal grid electrode, and the transmittance is related to the line width of the metal grid electrode.

By setting the line width of the metal grid electrode, the transmittance of the metal grid electrode to light can be improved, for example, not less than 90%; the metal grid electrode can be regarded as a transparent electrode, so as to reduce the resistance of the electrode of the electrochromic dimming structure without affecting the light transmission effect of the electrode as much as possible.

FIG. 2 illustratively shows that the surface of the first electrode layer 210 away from the metal grid electrode is a planar surface. In actual products, because the metal grid electrode is arranged between the first electrode layer 210 and the substrate 100, the surface of the first electrode layer 210 away from the metal grid electrode will have protrusions corresponding to the metal grid electrode. In the electrochromic dimming structure provided by the present application, by setting the thickness of the metal grid electrode thinner, it is helpful to reduce the height of the protrusions at the side of the first electrode layer away from the substrate, and to prevent the protrusions from affecting the performance of the electrochromic layer.

FIG. 2 illustratively shows that the metal grid electrode is located between the first electrode layer and the substrate, but it is not limited thereto, and the metal grid electrode can also be located at one side of the second electrode layer away from the substrate.

Figure 7:
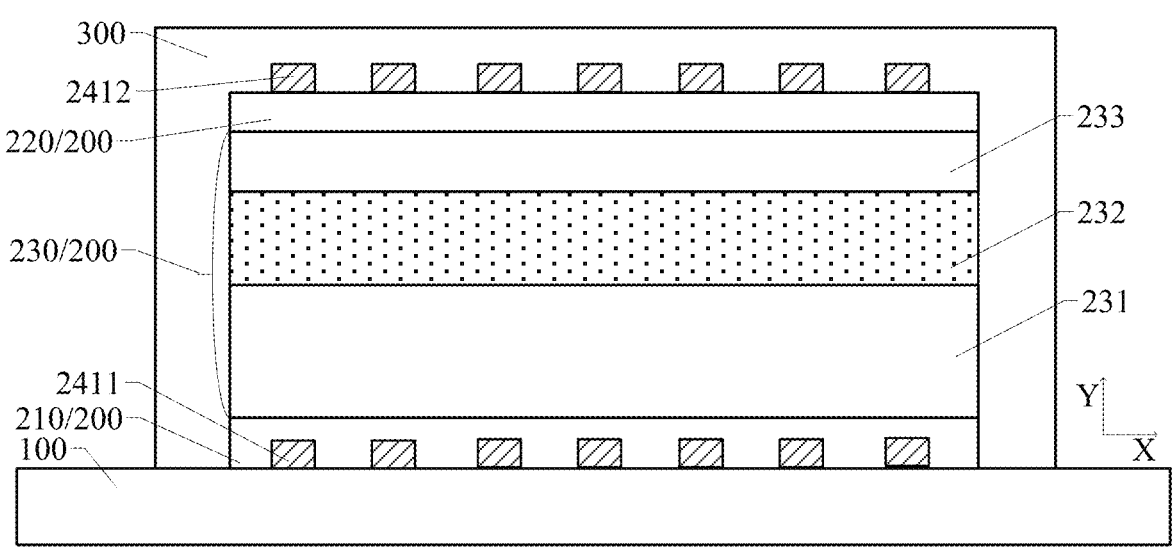
FIG. 7 is a schematic diagram of an electrochromic dimming structure provided by another example of the embodiment of the present disclosure.

FIG. 7 is a schematic diagram of an electrochromic dimming structure provided by another example of the embodiment of the present disclosure. As shown in FIG. 7, the metal grid electrode 241 includes a first metal grid electrode 2411 and a second metal grid electrode 2412, the first metal grid electrode 2411 is located at the side of the first electrode layer 210 away from the second electrode layer 220 and is electrically connected with the first electrode layer 210, the second metal grid electrode 2412 is located at the side of the second electrode layer 220 away from the first electrode layer 210 and is electrically connected with the second electrode layer 220. The first electrode layer 210 and the first metal grid electrode 2411 jointly serve as an electrode at one side of the electrochromic dimming structure, and the second electrode layer 220 and the second metal grid electrode 2412 jointly serve as an electrode at the other side of the electrochromic dimming structure.

By setting the first metal grid electrode electrically connected with the first electrode layer and the second metal grid electrode electrically connected with the second electrode layer, the resistance of the electrodes at both sides of the electrochromic dimming structure can be greatly reduced, and the electrochromic speed of the large-area electrochromic dimming structure can be effectively improved.

For example, a power supply configured to apply a voltage for electrochromic dimming can be directly connected with the metal grid electrode. However, it is not limited thereto, and the power supply configured to apply the voltage for electrochromic dimming can also be directly connected with the first electrode layer and the second electrode layer.

In some examples, as shown in FIG. 7, the overlapping ratio of the orthographic projection of the first metal grid electrode 2411 on the substrate 100 to the orthographic projection of the second metal grid electrode 2412 on the substrate 100 is greater than 90%. For example, the overlapping ratio of the orthographic projection of the first metal grid electrode 2411 on the substrate 100 to the orthographic projection of the second metal grid electrode 2412 on the substrate 100 is greater than 92%. For example, the overlapping ratio of the orthographic projection of the first metal grid electrode 2411 on the substrate 100 to the orthographic projection of the second metal grid electrode 2412 on the substrate 100 is greater than 95%. For example, the overlapping ratio of the orthographic projection of the first metal grid electrode 2411 on the substrate 100 to the orthographic projection of the second metal grid electrode 2412 on the substrate 100 is greater than 98%. For example, the orthographic projection of the first metal grid electrode 2411 on the substrate 100 completely coincides with the orthographic projection of the second metal grid electrode 2412 on the substrate 100.

By setting the overlapping relationship between the orthographic projections of the first metal grid electrode and the second metal grid electrode on the substrate, it is helpful to improve the light transmittance of the electrode of the electrochromic dimming structure.

For example, as shown in FIG. 7, the material of the second metal grid electrode 2412 can be the same as the material of the first metal grid electrode 2411, such as gold (Au), platinum (Pt), copper (Cu), molybdenum (Mo), silver (Ag), aluminum (Al), etc.

For example, as shown in FIG. 7, the thickness of the second metal grid electrode 2412 can be the same as the first metal grid electrode 2411, such as 100-5000 nanometers. For example, the thickness of the first metal grid electrode 2411 and the thickness of the second metal grid electrode 2412 can both be 1 micron.

For example, as shown in FIG. 7, the line width of the second metal grid electrode 2412 can be the same as that of the first metal grid electrode 2411, such as 1-5 microns. For example, the line width of the first metal grid electrode 2411 and the line width of the second metal grid electrode 2412 can both be 3 microns.

For example, as shown in FIG. 7, the metal grid electrode, such as the first metal grid electrode 2411 and the second metal grid electrode 2412, can be deposited by DC magnetron sputtering and patterned as needed.

For example, as shown in FIG. 7, the first metal grid electrode 2411 and the second metal grid electrode 2412 can be formed by patterning with a high-precision exposure machine, so as to set the line width of the metal grid electrode as small as possible, such as less than 3 microns, such as 2 microns, such as 1 micron, which is helpful to further reduce the visual presence of the metal grid electrode.

Figure 8:
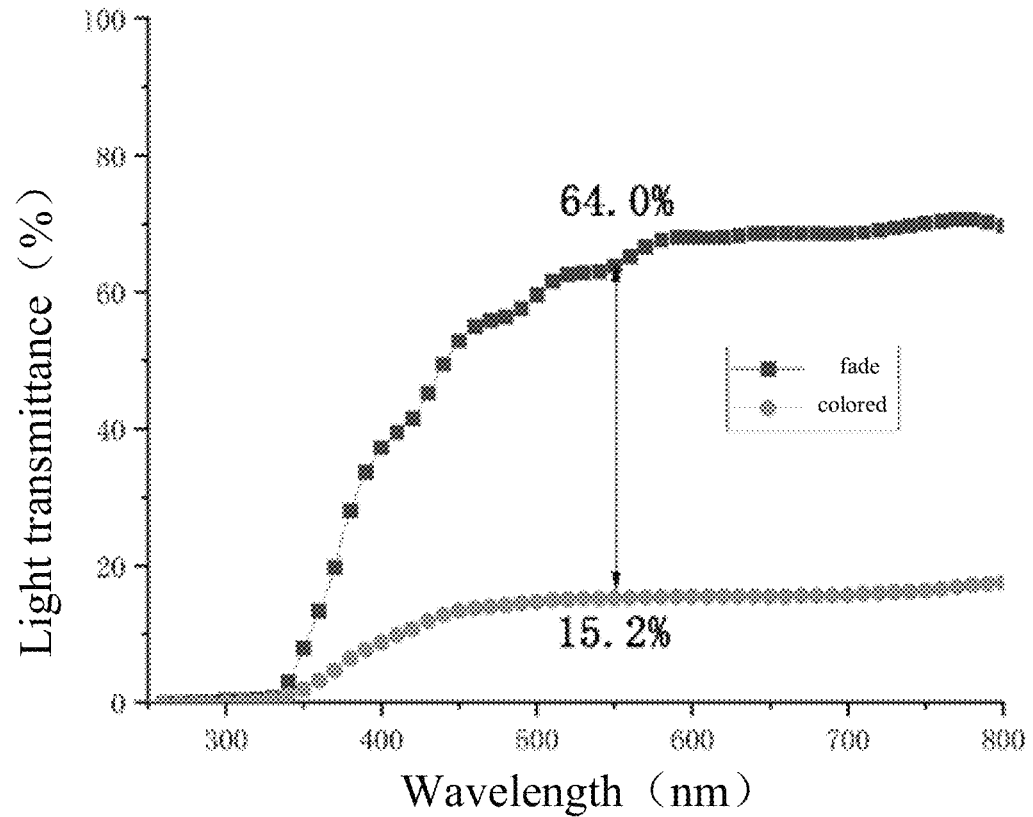
FIG. 8 shows the variation of light transmittance with wavelength of the electrochromic dimming structure shown in FIG. 7.

FIG. 8 shows the variation of light transmittance with wavelength of the electrochromic dimming structure shown in FIG. 7. As shown in FIG. 8, in the case where the electrochromic dimming structure is in a nearly transparent state, such as a faded state, the transmittance of light with a wavelength of 550 nm is about 64.0%; in the case where the electrochromic dimming structure is in a color-changing state, such as a colored state, the transmittance of light with a wavelength of 550 nm is about 15.2%, so the modulation degree of the electrochromic dimming structure for light with a wavelength of 550 nm is 48.8%.

Figure 9:
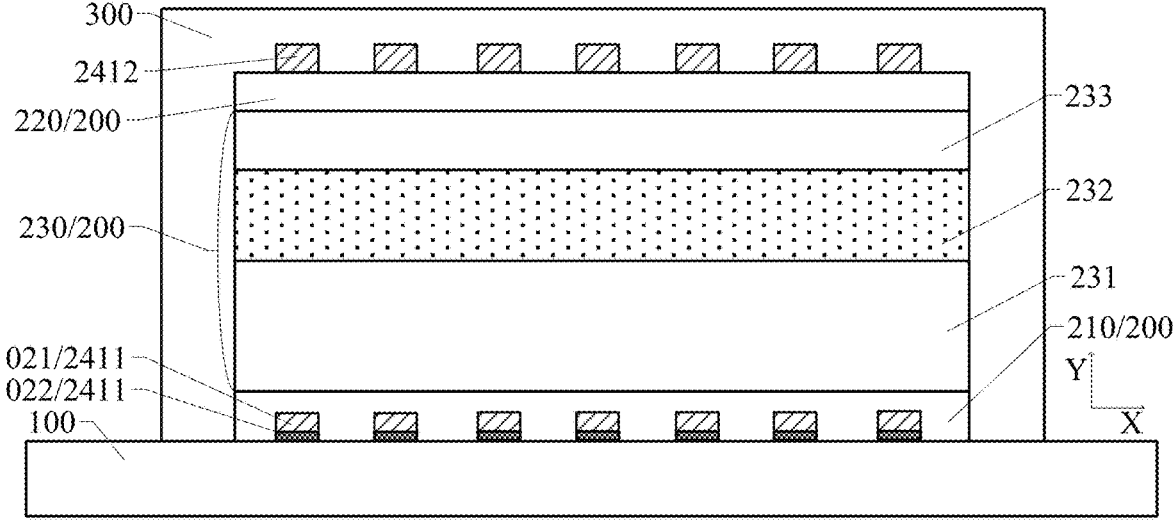
FIGS. 9 and 10 are schematic diagrams of electrochromic dimming structures provided by different examples of embodiments of the present disclosure.
Figure 10:
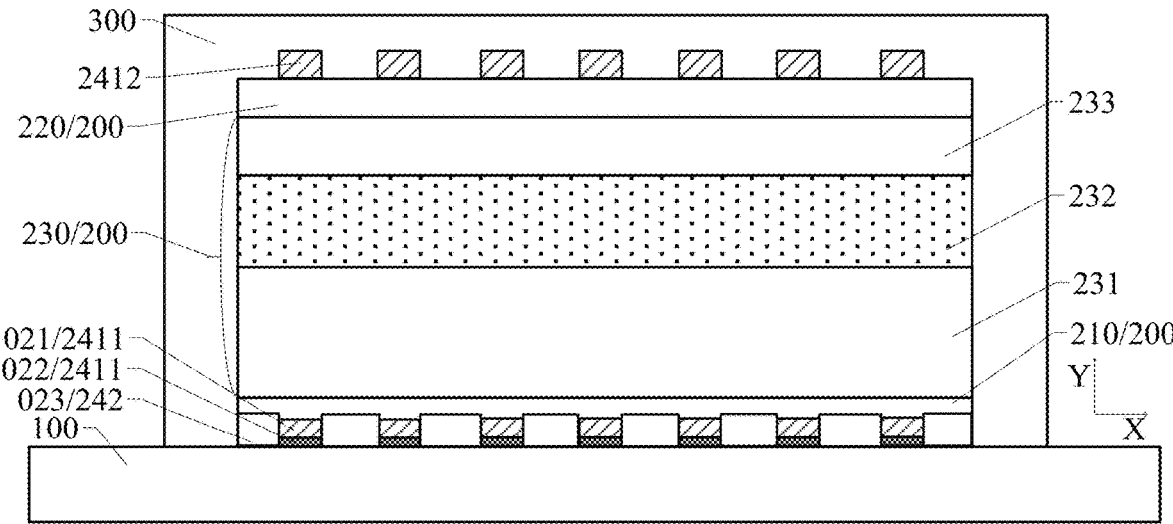

FIGS. 9 and 10 are schematic diagrams of electrochromic dimming structures provided by different examples of embodiments of the present disclosure. The difference between the electrochromic dimming structure shown in FIG. 9 and the electrochromic dimming structure shown in FIG. 10 lies in whether a defining structure 023 is provided.

For example, as shown in FIGS. 9 and 10, the first metal grid electrode 2411 includes two metal layers, such as a metal layer 021 and a metal layer 022. For example, the metal layer 022 can be an electroplating seed layer and can be patterned into a metal grid structure; the metal layer 021 can be a film layer grown on the metal layer 022 by electroplating. For example, the material of the metal layer 021 can be molybdenum, and the material of the metal layer 022 can be copper. For example, the thickness of the metal layer 022 can be 300 nanometers, and the thickness of the metal layer 021 can be greater than 1 micron. The electroplating method can form a metal grid electrode with a thicker thickness (such as 1-100 microns, such as 2-5 microns, such as 3-4 microns), and the cost is relatively low.

For example, as shown in FIG. 10, a defining structure 023 is provided in the hollow region 242 of the first metal grid electrode 2411, and configured to define the thickness of the metal layer 022. For example, the defining structure 023 can be made of a transparent organic material, such as polyimide (PI), acrylic adhesive, etc. For example, the defining structure 023 can also be made of a transparent inorganic material, such as silicon oxide, silicon nitride, etc. For example, the thickness of the defining structure 023 can be in the range of 1.5-2.5 microns. For example, the thickness of the defining structure 023 can be 2 microns.

For example, after the defining structure 023 is formed, the defining structure 023 and the metal layer 023 can be put into an electroplating solution to electroplate the metal layer 022.

Figure 11:
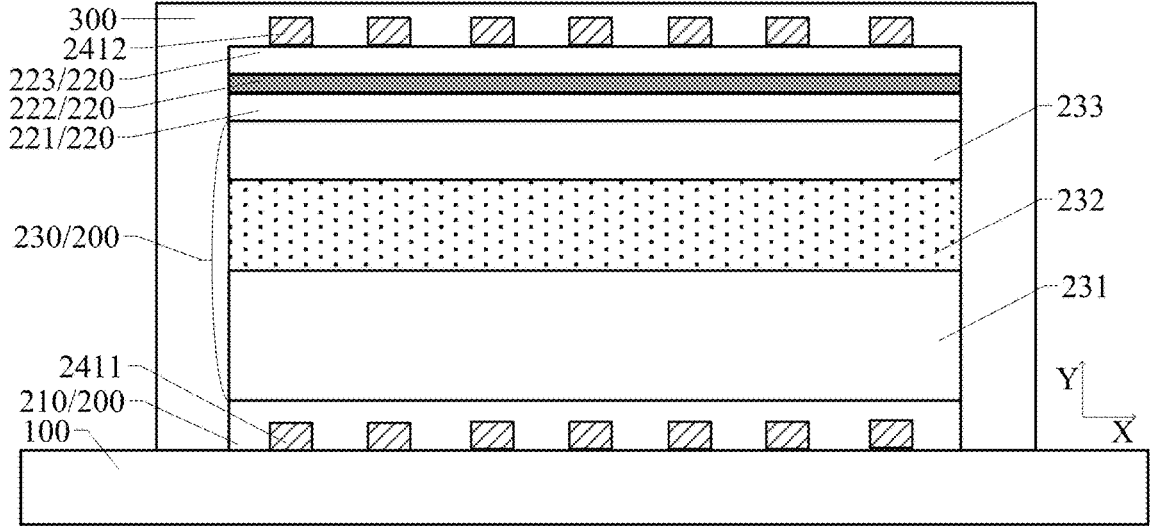
FIG. 11 is a schematic diagram of an electrochromic dimming structure provided by another example of the embodiment of the present disclosure.

FIG. 11 is a schematic diagram of an electrochromic dimming structure provided by another example of the embodiment of the present disclosure. Components other than the second electrode layer in the electrochromic dimming structure shown in FIG. 11 can have the same features as the corresponding components in the above examples, and details will not be repeated here.

In some examples, as shown in FIG. 11, the second electrode layer 220 includes a first film layer 221, a second film layer 222 and a third film layer 223 which are stacked. the first film layer 221 and the third film layer 223 are made of the same material, the thickness ratio of the first film layer 221 to the third film layer 223 is in the range of 0.9-1.1, and the thickness of the second film layer 222 is less than the thickness of the first film layer 221.

For example, the first film layer 221 and the third film layer 223 have the same thickness. For example, the materials of the first film layer 221 and the third film layer 223 can be aluminum-doped zinc oxide (AZO), and the material of the second film layer 222 can be silver (Ag). For example, the materials of the first film layer 221 and the third film layer 223 can be indium tin oxide (ITO), and the material of the second film layer 222 can be silver (Ag).

For example, the thickness of the first film layer 221 and the thickness of the third film layer 223 can both be 50 nm, and the thickness of the second film layer 222 can be 30 nm. For example, the second electrode layer 220 can adopt a sandwich structure including a thin silver layer.

By utilizing the optical micro-cavity effect to reduce the heating effect of the infrared band of solar spectral energy on the electrochromic dimming structure, it is helpful to improve the reliability and cycling characteristics of the electrochromic dimming structure.

Figure 12:
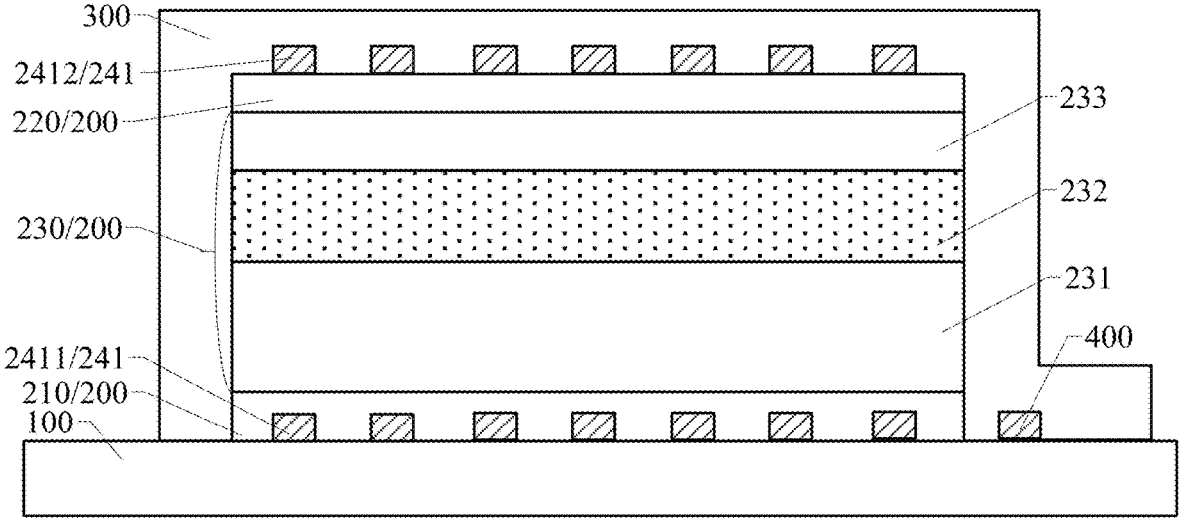
FIG. 12 is a schematic diagram of an electrochromic dimming structure provided by another example of the embodiment of the present disclosure.

FIG. 12 is a schematic diagram of an electrochromic dimming structure provided by another example of the embodiment of the present disclosure. The electrochromic dimming structure shown in FIG. 12 is different from the electrochromic dimming structure shown in FIG. 7 in that the electrochromic dimming structure shown in FIG. 12 further includes an antenna structure 400 which is disposed in the same layer as and separated from at least part of the metal electrode. The substrate 100, the first electrode layer 210, the second electrode layer 220, the electrochromic layer 230 and the first protective layer 300 in the electrochromic dimming structure shown in FIG. 12 can have the same features as the corresponding components in any examples shown in FIGS. 2-11, and details will not be repeated here.

In the electrochromic dimming structure provided by the present disclosure, by setting the antenna structure in the same layer as at least part of the metal electrode, the resistance of the electrode of the electrochromic device can be reduced to effectively improve the electrochromic speed of the large-area electrochromic dimming structure, and at the same time, the reception and transmission of microwave signals can be realized without adding a film layer. For example, the antenna structure can be used for satellite communication. For example, the antenna structure can achieve the function of receiving and transmitting microwave signals, such as 4G and 5G, etc.

For example, FIG. 12 illustratively shows that the metal grid electrode 241 includes a first metal grid electrode 2411 and a second metal grid electrode 2412, but it is not limited thereto. The metal grid electrode 241 can also include only one layer of structure, such as only one layer of grid electrode electrically connected with the first electrode layer, or only one layer of grid electrode electrically connected with the second electrode layer.

In some examples, as shown in FIG. 12, the antenna structure 400 is disposed in the same layer as one of the first metal grid electrode 2411 and the second metal grid electrode 2412.

In some examples, as shown in FIG. 12, the antenna structure 400 is disposed in the same layer as the first metal grid electrode 2411, and the first protective layer 300 covers the antenna structure 400. The first protective layer is used to protect the antenna structure.

In some examples, as shown in FIG. 12, the shape of the antenna structure 400 is the same as the shape of the metal grid electrode 241 at at least some positions, and the antenna structure 400 overlaps or does not overlap with the electrochromic layer 230 in the direction perpendicular to the substrate 100.

For example, as shown in FIG. 12, the antenna structure 400 can be formed in the same step patterning process as the first metal grid electrode 2411, and the antenna structure 400 is formed in a metal grid shape. For example, the antenna structure 400 and the first metal grid electrode 2411 can have the same material, thickness and line width.

FIG. 12 illustratively shows that the antenna structure does not overlap with the electrochromic layer, so as to reduce the mutual interference between the electrochromic device and the antenna structure. In the case where the electrochromic dimming structure is applied to the sunroof of a transportation apparatus, the antenna structure can be clamped in a groove, which is a groove for clamping the edge of the sunroof.

Of course, the embodiment of the present disclosure is not limited thereto, and the antenna structure with the same shape as the metal grid electrode at at least some positions can be overlapped with the electrochromic layer. Because the antenna structure has good light transmission characteristics, the area of the electrochromic device can be increased by overlapping the electrochromic layer with the antenna structure.

Figure 13:
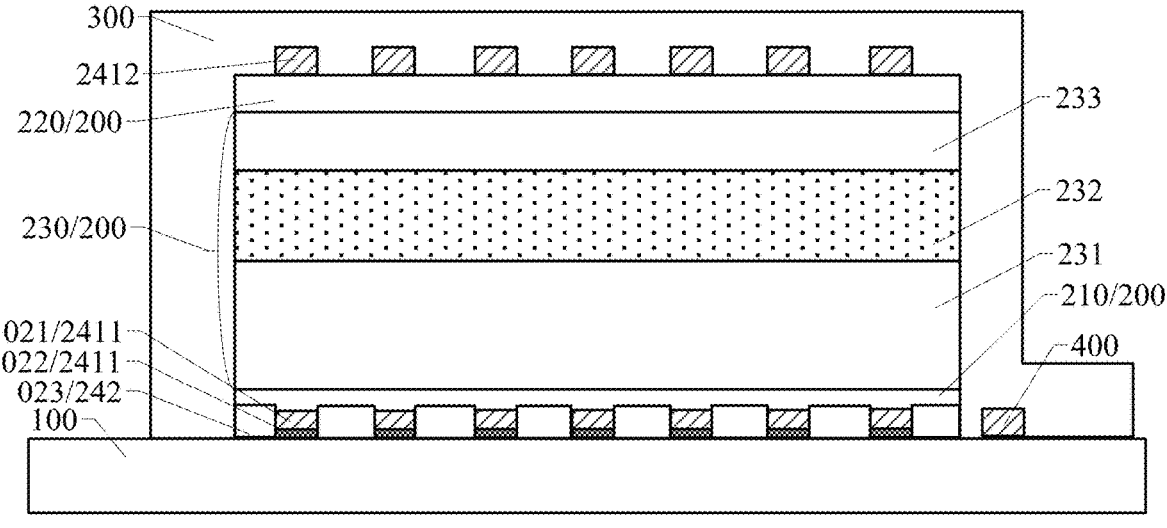
FIG. 13 is a schematic diagram of an electrochromic dimming structure provided by another example of the embodiment of the present disclosure.

FIG. 13 is a schematic diagram of an electrochromic dimming structure provided by another example of the embodiment of the present disclosure. The electrochromic dimming structure shown in FIG. 13 is different from the electrochromic dimming structure shown in FIG. 10 in that the electrochromic dimming structure shown in FIG. 13 further includes an antenna structure 400 disposed in the same layer as and separated from the metal grid electrode. The substrate 100, the first electrode layer 210, the second electrode layer 220, the electrochromic layer 230 and the first protective layer 300 in the electrochromic dimming structure shown in FIG. 13 can have the same features as the corresponding components in any examples shown in FIGS. 2-11, and details will not be repeated here. For example, as shown in FIG. 13, the first protective layer 300 covers the antenna structure 400.

In some examples, as shown in FIG. 13, the first metal grid electrode 2411 includes two metal layers 021 and 022, and the material of the antenna structure 400 is the same as the material of the metal layer 021 away from the substrate 100 in the two metal layers 021 and 022. The antenna structure 400 shown in FIG. 13 can have the same features as the antenna structure 400 shown in FIG. 12, and details will not be repeated here.

Figure 14:
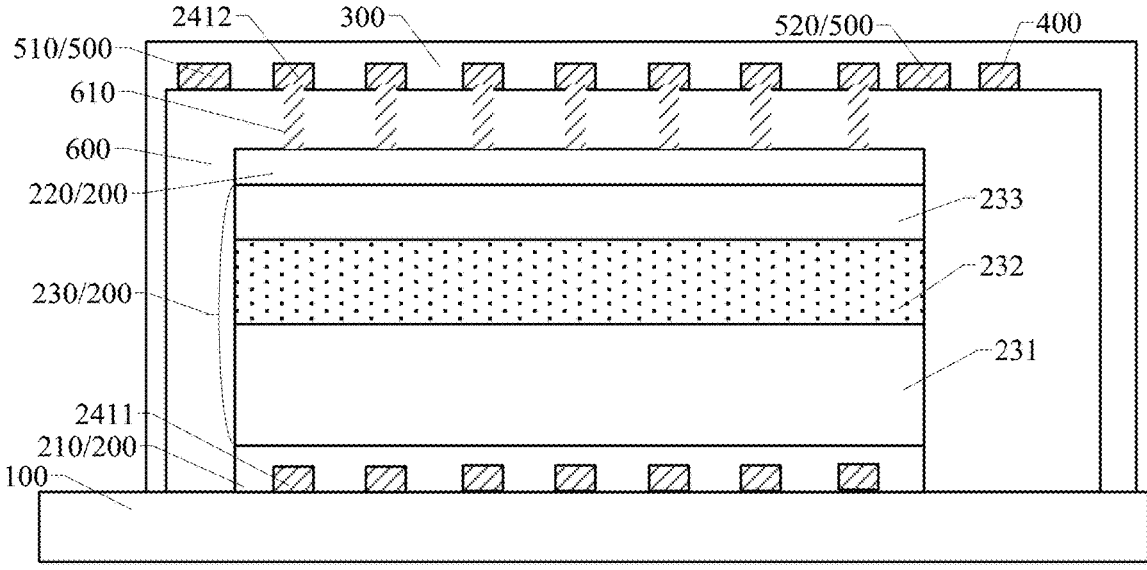
FIG. 14 is a schematic diagram of an electrochromic dimming structure provided by another example of the embodiment of the present disclosure.

FIG. 14 is a schematic diagram of an electrochromic dimming structure provided by another example of the embodiment of the present disclosure. The electrochromic dimming structure shown in FIG. 14 is different from the electrochromic dimming structure shown in FIG. 7 in that the electrochromic dimming structure shown in FIG. 14 further includes an antenna structure 400 disposed in the same layer as and separated from the metal grid electrode. For example, the number of antenna structures 400 can be one, two or more. The substrate 100, the first electrode layer 210, the second electrode layer 220, and the electrochromic layer 230 in the electrochromic dimming structure shown in FIG. 12 can have the same features as the corresponding components in any examples shown in FIGS. 2-11, and details will not be repeated here.

In some examples, as shown in FIG. 14, the electrochromic dimming structure further includes a second protective layer 600 covering the second electrode layer 220. For example, the second protective layer 600 can cover the surface of the second electrode layer 220 away from the substrate 100, the electrochromic layer 230 and the side surface of the first electrode layer 210. For example, the second protective layer 600 can be made of the same material as the first protective layer 300, such as silicon dioxide. For example, the thickness of a part of the second protective layer 600 at the side of the second electrode layer 220 away from the substrate 100 can be in the range of 80-120 nanometers. For example, the thickness of the part of the second protective layer 600 at the side of the second electrode layer 220 away from the substrate 100 can be 100 nanometers.

In some examples, as shown in FIG. 14, at least part of the second metal grid electrode 2412 and the antenna structure 400 are located at one side of the second protective layer 600 away from the substrate 100, the second protective layer 600 includes a groove 610 configured to expose the second electrode layer 220, and the second metal grid electrode 2412 is electrically connected with the second electrode layer 220 through the groove 610. For example, reactive ion etching (RIE) or inductively coupled plasma (ICP) equipment can be used to dry etch the second protective layer 600, so as to pattern to form a grid-shaped groove 610. For example, the shape of the groove 610 can be the same as the shape of the second metal grid electrode 2412.

In some examples, as shown in FIG. 14, an electrode portion 500 is further disposed at one side of the second protective layer 600 away from the second electrode layer 220, and the electrode portion 500 is electrically connected with the second metal grid electrode 2412. For example, the electrode portion 500 can include a first electrode portion 510 and a second electrode portion 520, and a voltage difference can be formed by applying different voltages to the first electrode portion 510 and the second electrode portion 520. When the second metal grid electrode 2412 is applied with a voltage by the electrode portion 500, heat is generated, and for example, the electrochromic dimming structure can be deiced or defogged. For example, upon the electrochromic dimming structure being applied in a sunroof of a transportation apparatus, a voltage is applied to the second metal grid electrode through the electrode portion, and the second metal grid electrode is equivalent to having a heater function, which can have functions, such as promoting winter snowmelt, evaporating water film on the sunroof, and defogging, etc.

For example, as shown in FIG. 14, in the case where the electrochromic dimming structure is used for dimming, only one electrode portion among the electrode portions 500 is configured to apply a voltage to the second metal grid electrode 2412, so as to realize the color change of the electrochromic layer; in the case where the second metal grid electrode 2412 is used for heating, voltage is applied to two electrode portions among the electrode portions 500, but no voltage is applied to the first metal grid electrode 2411, and the electrochromic dimming structure does not work in this case.

In some examples, as shown in FIG. 14, the first protective layer 300 covers the second metal grid electrode 2412 and the antenna structure 400, so as to protect the electrochromic device and the antenna structure.

Figure 15:
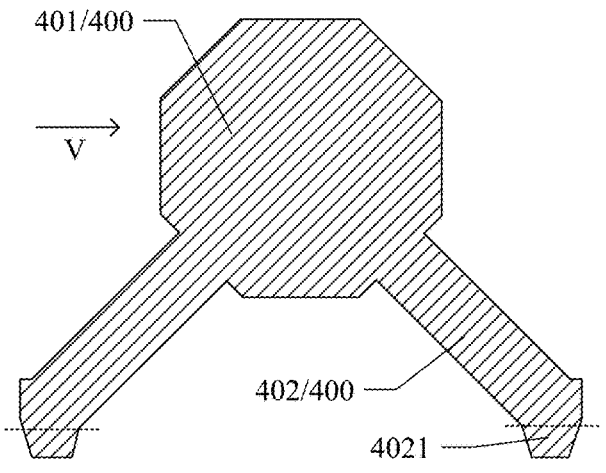
FIGS. 15-17 are planar structural views of antenna structures provided by different examples of the embodiment of the present disclosure.
Figure 16:
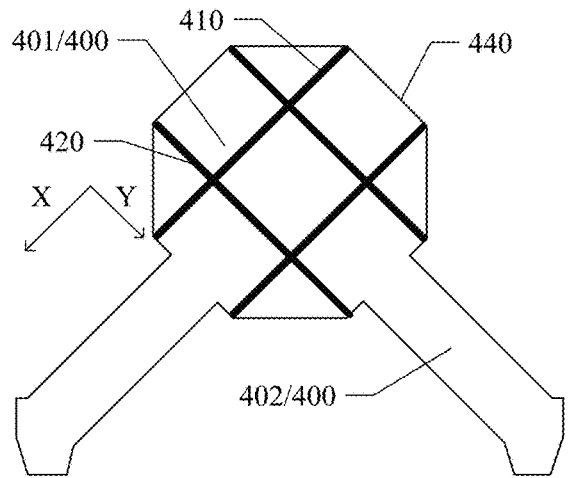
Figure 17:
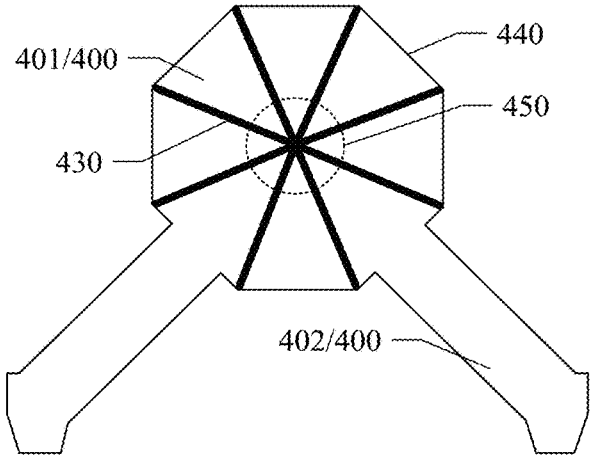
Figure 18:
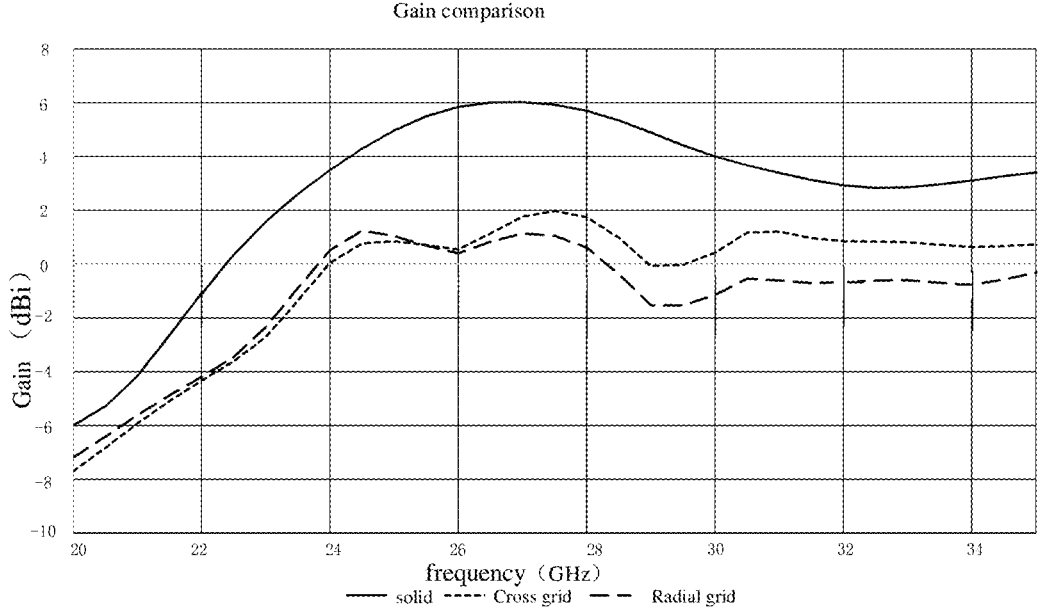
FIG. 18 shows a gain comparison of the antenna structures shown in FIGS. 15-17.
Figure 19:
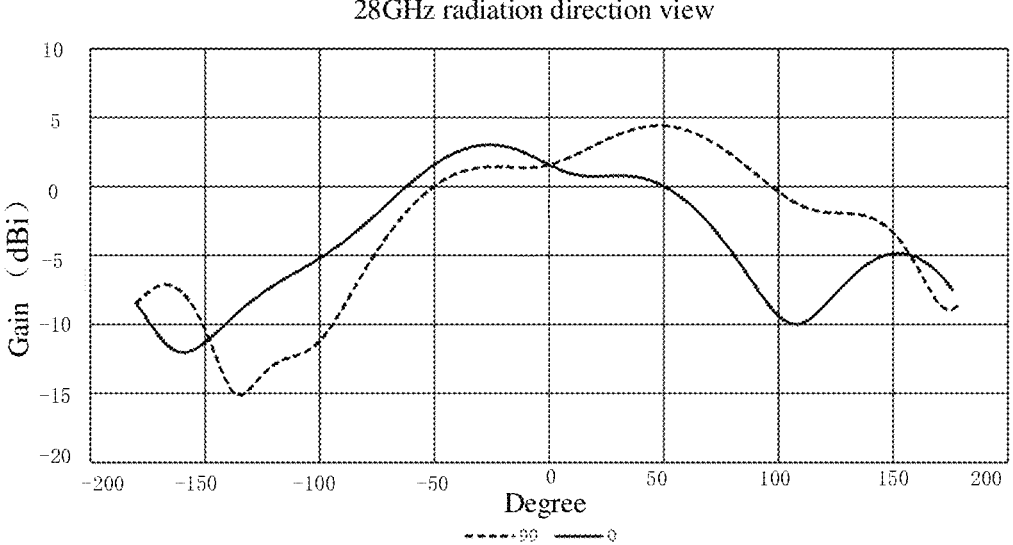
FIG. 19 shows a gain of the antenna structure shown in FIG. 15 in different radiation directions.
Figure 20:
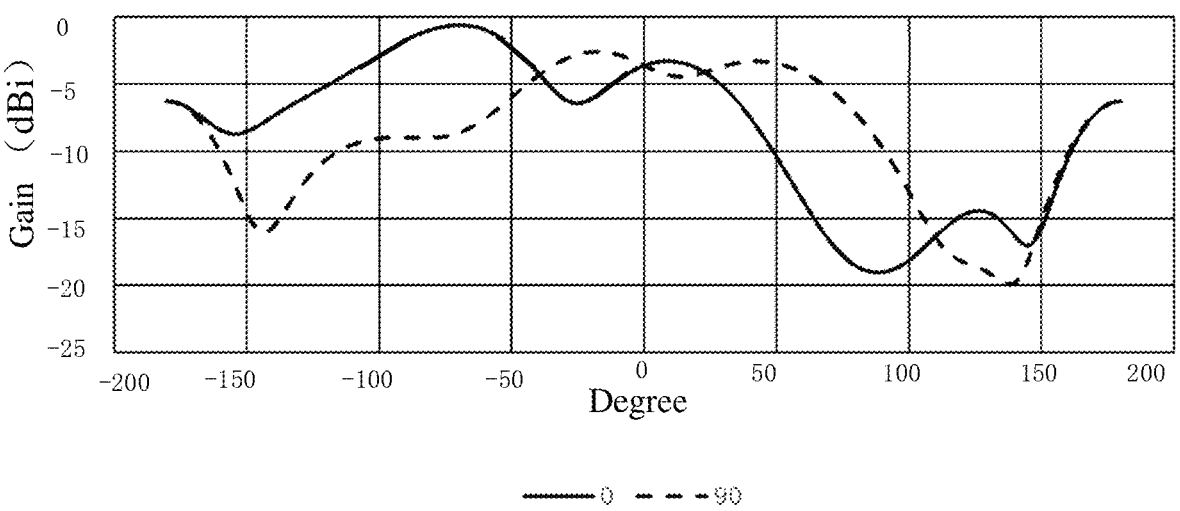
FIG. 20 shows a gain of the antenna structure shown in FIG. 16 in different radiation directions.
Figure 21:
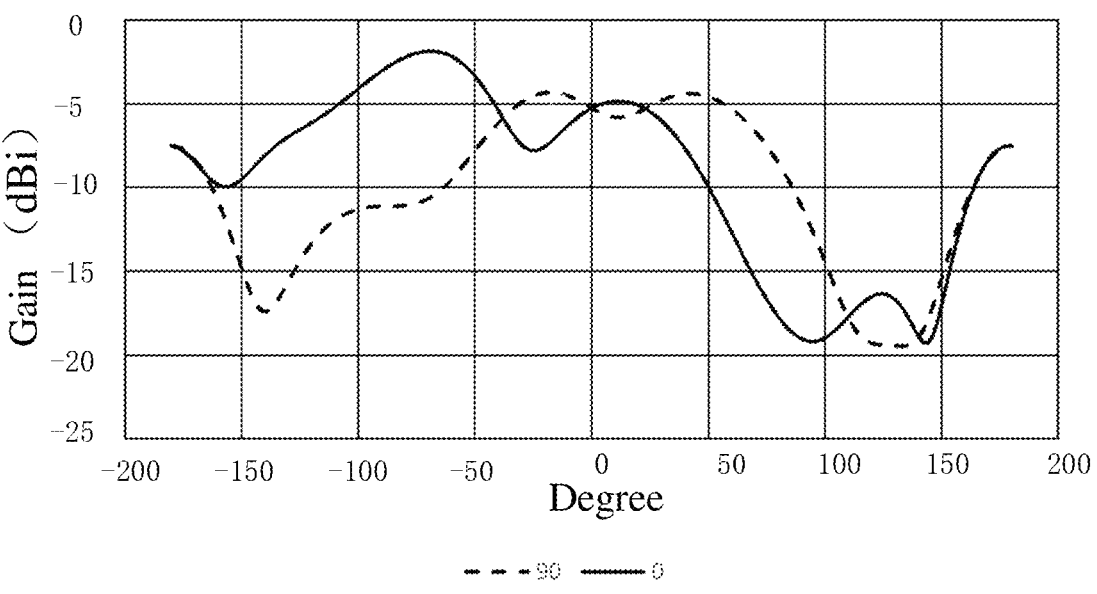
FIG. 21 shows a gain of the antenna structure shown in FIG. 17 in different radiation directions.

FIGS. 15-17 are planar structural views of antenna structures provided by different examples of the embodiment of the present disclosure, FIG. 18 shows a gain comparison of the antenna structures shown in FIGS. 15-17, FIG. 19 shows a gain of the antenna structure shown in FIG. 15 in different radiation directions, FIG. 20 shows a gain of the antenna structure shown in FIG. 16 in different radiation directions, and FIG. 21 shows a gain of the antenna structure shown in FIG. 17 in different radiation directions.

Any antenna structure in the examples shown in FIGS. 15-17 can be applied to the antenna structure in the electrochromic dimming structure shown in FIGS. 12-14.

In some examples, the metal electrode includes a first metal electrode and a second metal electrode, the first metal electrode is located at one side of the first electrode layer away from the second electrode layer and is electrically connected with the first electrode layer, the second metal electrode is located at one side of the second electrode layer away from the first electrode layer and is electrically connected with the second electrode layer; the antenna structure is disposed in the same layer as the first metal electrode, and the thickness of the antenna structure is greater than the thickness of the second metal electrode.

In some examples, the first metal electrode includes a first metal grid electrode or a first metal thin layer, and the second metal electrode includes a second metal thin layer.

In some examples, as shown in FIGS. 12-15, the antenna structure 400 includes a solid structure, and the antenna structure 400 does not overlap with the electrochromic layer 230 in a direction perpendicular to the substrate 100. For example, the profile shape of the antenna structure 400 can be polygonal, and the solid structure described above means that the part surrounded by the polygonal profile of the antenna structure 400 is a solid structure, excluding hollow.

For example, as shown in FIGS. 12-15, the shape of the antenna structure 400 can be different from the shape of the metal grid electrode arranged in the same layer. For example, in the direction parallel to the line width of the metal grid electrode, the size of the antenna structure 400 is greater than the line width of the metal grid electrode. For example, the size of the octagon in the V direction can be in the range of 2-3 mm, such as 2.3 mm. For example, the size of the octagon in the V direction determines the ranges of resonance frequency and gain. For example, at this size, it resonates around 28 GHz and the highest gain is at 27 dBi. For example, the ranges of resonant frequency and gain of the antenna structure will change with the size of the octagon.

In some examples, as shown in FIG. 15, the antenna structure 400 includes a main body portion 401, the shape of the main body portion 401 is an octagon, and the included angle between at least two adjacent sides of the octagon is 135 degrees. For example, the main body portion 401 is a portion for transmitting microwave signals and receiving microwave signals. For example, the above two adjacent sides refer to two sides having a direct connection relationship.

For example, in the case where the antenna structure adopts a rectangular structure, the electric length of radiation is the distance between the upper side and the lower side (assuming that the lower side of the rectangle is connected to the feeder line and the upper and lower sides are perpendicular to the feeder line), and the current can only oscillate at a fixed electric length, thus generating radiation; and the left and right sides of the rectangle (which are parallel to the feeder line) do not participate in radiation. For example, the antenna structure can be a microstrip transmission line, and the ratio of its physical length to the wavelength of the transmitted electromagnetic wave is the electric length. For example, in the case where the antenna structure adopts an octagonal structure, the electric length is not constant because of the existence of an inclined side, such as the inclined side having an inclination angle of 135 degrees, and only the sides parallel to the feeder line do not participate in radiation (the generated current oscillation is very small, which can be ignored), and other sides perpendicular to the feeder line or having a certain angle with the feeder line can participate in radiation, so the electric length is variable. Compared with the structure with a constant electric length, the octagon has more sides to participate in radiation, and the electric length can change to some extent. Therefore, its radiation gain will be increased to some extent compared with the rectangular structure. For example, the bandwidth of the rectangular structure is generally 10% of the central frequency, and that of the octagonal structure can be extended to 10%-20%. The bandwidth of high frequency band (especially millimeter wave) determines its transmission capacity, so high frequency antennas are generally required to be broadband or ultra-broadband.

For example, taking the V direction shown in FIG. 15 as a reference direction, the extending direction of one of two adjacent sides is parallel to or perpendicular to the V direction, and the included angle between the extending direction of the other of the two adjacent sides and the V direction is +45 degrees or −45 degrees. For example, as shown in FIG. 15, an octagon includes two sides, the included angle between the extending direction of one of the two sides and the V direction is +45 degrees, and the included angle between the extending direction of the other of the two sides and the V direction is −45 degrees. For example, the antenna structure adopts dual-polarized antenna technology, which combines two antennas with orthogonal polarization directions of +45 degrees and −45 degrees and works in the transceiver duplex mode at the same time, so it is helpful to save the number of antennas.

The main body portion of the antenna structure provided by the embodiment of the present disclosure adopts an octagonal profile, and the sides of the octagonal profile can resonate; the antenna structure adopting the octagonal profile has more resonance sides, which is helpful to realize the miniaturization of the antenna structure while providing maximum gain; moreover, the included angle between at least two adjacent sides of the octagon is set to 135 degrees, which is helpful to increase the bandwidth and is suitable for high frequency requirements.

Of course, the embodiment of the present disclosure is not limited thereto, and the shape of the main body portion of the antenna structure can also be a quadrilateral, such as a rectangle or a square, or a hexagon or other polygons.

For example, as shown in FIG. 15, the antenna structure 400 further includes two electrode portions 402 electrically connected with the main body portion 401, and for example, the two electrode portions 402 are configured to receive different electrical signals. For example, the electrode portions 402 and the main body portion 401 can be an integrated structure. For example, the two electrode portions 402 can be connected to two inclined sides of the octagon, respectively.

For example, as shown in FIG. 15, an end of the electrode portion 402 away from the main body portion 401 includes a bonding portion 4021, and the shape of the bonding portion 4021 includes a trapezoid. The bonding portion 4021 is configured for bonding with a circuit board and can play an impedance matching role. For example, the wiring of the circuit board (FPC) is thin, and the shape of the bonding portion 4021 is set to be a trapezoidal shape; compared with a rectangular shape, it can reduce the difference of wiring width in the bonding process and avoid poor port parameters.

By setting the shapes of the main body portion and the electrode portion of the antenna structure, it is helpful to improve the radiation effect of the antenna structure while improving the signal transmission effect.

For example, as shown in FIGS. 18 and 19, by setting the antenna structure as an octagonal solid structure with dual-polarized antenna technology as shown in FIG. 15, it is helpful to improve the radiation effect of the antenna structure, and for example, the maximum gain of the antenna structure is about 6 dBi; the maximum gain of the antenna structure in each radiation direction at the 0-degree phase at the frequency of 28 GHz is about 4.4 dBi, and the maximum gain of the antenna structure in each radiation direction at the 90-degree phase at the frequency of 28 GHz is about 3 dBi.

For example, as shown in FIGS. 12-15, the thickness of the antenna structure 400 can be the same as the thickness of the first metal grid electrode 2411 disposed in the same layer as the antenna structure 400, or in the case where the first metal grid electrode 2411 has a plurality of film layers, the thickness of the antenna structure 400 can be the same as the thickness of the film layer farthest from the substrate 100 among the plurality of film layers. In the electrochromic dimming structure provided by the present disclosure, the antenna structure and one layer of metal grid are formed in the same step patterning process, and the thickness of the antenna structure can be set to be the same as the thickness of the layer of metal grid, or as the thickness of at least one film layer in the layer of metal grid; and at the same time, the antenna structure is set to be a solid structure and does not overlap with the electrochromic device, so that the influence of the electrochromic device on the radiation effect of the antenna structure can be avoided, and it is helpful to make the antenna structure have a better radiation effect. In the case where the electrochromic dimming structure including the above antenna structure is applied to the sunroof of a transportation apparatus, the antenna structure can be clamped in a groove, which is a groove for setting the sunroof, so as to prevent the antenna structure from affecting the light transmission effect of the electrochromic dimming structure.

In some examples, as shown in FIGS. 16 and 17, the antenna structure 400 includes a grid structure. For example, the main body portion 401 of the antenna structure 400 includes a grid structure. FIGS. 12-14 illustratively show that the antenna structure 400 does not overlap with the electrochromic layer 230 in the direction perpendicular to the substrate 100. But not limited thereto, in the case where the antenna structure includes a grid structure, the antenna structure has a good light transmission effect, and the antenna structure can overlap with the electrochromic layer, which is helpful to increasing the area of a region of the electrochromic device used for color change.

The profile of the antenna structure shown in FIGS. 16 and 17 can be the same as the profile of the antenna structure shown in FIG. 15, and details will not be repeated here.

In some examples, as shown in FIG. 16, the main body portion 401 of the antenna structure 400 includes a plurality of contour sides 440 surrounding the grid structure, the grid structure includes a first strip portion 410 extending along a first direction and a second strip portion 420 extending along a second direction, and the first direction intersects with the second direction. For example, the first direction can be the X direction in the figure, the second direction can be the Y direction in the figure, and the first direction and the second direction can be interchanged. For example, the first direction and the second direction can be perpendicular to each other, but not limited thereto. For example, the included angle between the first direction and the second direction can be in the range of 30-120 degrees; for example, the included angle between the first direction and the second direction can be in the range of 45-100 degrees; for example, the included angle between the first direction and the second direction can be in the range of 60-80 degrees. For example, the included angle between the first strip portion 410 and at least one contour side 440 is 45 degrees, and the included angle between the second strip portion 420 and at least one contour side 440 is 45 degrees.

For example, as shown in FIG. 16, the first strip portion 410 can be connected with the connection point of two adjacent contour sides 440, the included angle between the first strip portion 410 and one of the two adjacent contour sides 440 can be 45 degrees, and the included angle between the first strip portion 410 and the other of the two adjacent contour sides 440 can be 90 degrees. Referring to the extending directions of the contour sides of the antenna structure 400 in FIG. 15, the first strip portion 410 and the second strip portion 420 in the antenna structure 400 shown in FIG. 16 can form a dual-polarized antenna with orthogonal polarization directions of +45 degrees and −45 degrees, so it is helpful to save the number of antennas.

For example, as shown in FIG. 16, the number of the first strip portions 410 is the same as the number of the second strip portions 420, so as to have symmetry. In this case, the performance of the two polarization directions is the same; for example, the isolation degrees S21 and S12 are the same, and the two channels can be switched arbitrarily. Of course, the embodiment of the present disclosure is not limited thereto, and the number of first strip portions can be different from the number of second strip portions. In this case, the performance of the two channels may be very different, and the isolation degrees S21 and S12 are different. If performance is required, the two channels cannot be switched arbitrarily.

For example, the line widths of the first strip portion 410 and the second strip portion 420 can both be the same as the line width of the metal grid electrode, so as to facilitate manufacture. For example, the line width of the contour side 440 can be the same as the line width of the metal grid electrode. For example, the first strip portion 410, the second strip portion 420 and the contour side 440 can be an integrated structure.

For example, both ends of the first strip portion 410 are connected with the contour side 440, and both ends of the second strip portion 420 are connected with the contour side 440.

For example, FIG. 16 illustratively shows that both the number of the first strip portions 410 and the number of the second strip portions 420 are two, but it is not limited thereto. In the case where the antenna structure does not overlap with the electrochromic layer, the number of the first strip portions and the number of the second strip portions can be appropriately increased to improve the radiation effect of the antenna structure. In the case where the antenna structure overlaps with the electrochromic layer, the number of the first strip portions and the number of the second strip portions need to be set in consideration of the light transmission effect and radiation effect of the antenna structure.

For example, as shown in FIGS. 18 and 20, by setting the antenna structure as a grid structure using dual-polarized antenna technology as shown in FIG. 16, it is helpful to improve the radiation effect of the antenna structure, and for example, the maximum gain of the antenna structure is about 2 dBi; the maximum gain of the antenna structure in each radiation direction at the 0-degree phase at the frequency of 28 GHz is about −0.61 dBi, and the maximum gain of the antenna structure in each radiation direction at the 90-degree phase at the frequency of 28 GHz is about −2.5 dBi.

For example, FIG. 16 only illustrates the grid structure in the main body portion, and the electrode portion of the antenna structure can also be arranged in a grid structure.

In some examples, as shown in FIG. 17, the antenna structure 400 includes a plurality of contour sides 440 surrounding the grid structure, and the grid structure includes a plurality of strip portions 430 radially arranged starting from a point in a central region 450 of the main body portion 401. The central region can refer to, for example, a region with a radius of $1/4$-$3/4$ of the diagonal length of the octagon and centered on the center of the octagonal profile. For example, the starting point of the plurality of strip portions 430 radially arranged can be the center point of the central region.

For example, as shown in FIG. 17, the ending point of at least one strip portion 430 can be connected with the contour side 440. For example, the ending point of each strip portion 430 is connected with the contour side 440. For example, the ending point of the strip portion 430 can be connected with one end of the contour side 440 or with any point on the contour side 440. For example, the strip portion 430 and the contour side 440 can be an integrated structure. For example, the line widths of the strip portion 430 and the contour side 440 can both be the same as the line width of the metal grid electrode, so as to facilitate manufacture.

For example, FIG. 17 only illustrates the grid structure in the main body portion, and the electrode portion of the antenna structure can also be arranged in a grid structure.

For example, FIG. 17 illustratively shows that the number of strip portions 430 is eight, but it is not limited thereto. In the case where the antenna structure does not overlap with the electrochromic layer, the number of strip portions can be appropriately increased to improve the radiation effect of the antenna structure. In the case where the antenna structure overlaps with the electrochromic layer, the number of strip portions needs to be set in consideration of the light transmission effect and radiation effect of the antenna structure.

For example, as shown in FIGS. 18 and 21, by setting the antenna structure as a grid structure using dual-polarized antenna technology as shown in FIG. 17, it is helpful to improve the radiation effect of the antenna structure, and for example, the maximum gain of the antenna structure is about 1.5 dBi; the maximum gain of the antenna structure in each radiation direction at the 0-degree phase at the frequency of 28 GHz is about −1.8 dBi, and the maximum gain of the antenna structure in each radiation direction at the 90-degree phase at the frequency of 28 GHz is about −4.3 dBi.

For example, as shown in FIG. 18, the radiation effect of the antenna structure with a solid structure is better than the radiation effect of the antenna structure with a grid structure. Comparing the antenna structures with grid structures shown in FIGS. 16 and 17, it is found that the grid structure shown in FIG. 16 is beneficial to the uniform distribution of current, so that the current can be smoothly conducted and the resonance can generate strong radiation.

Figure 22:
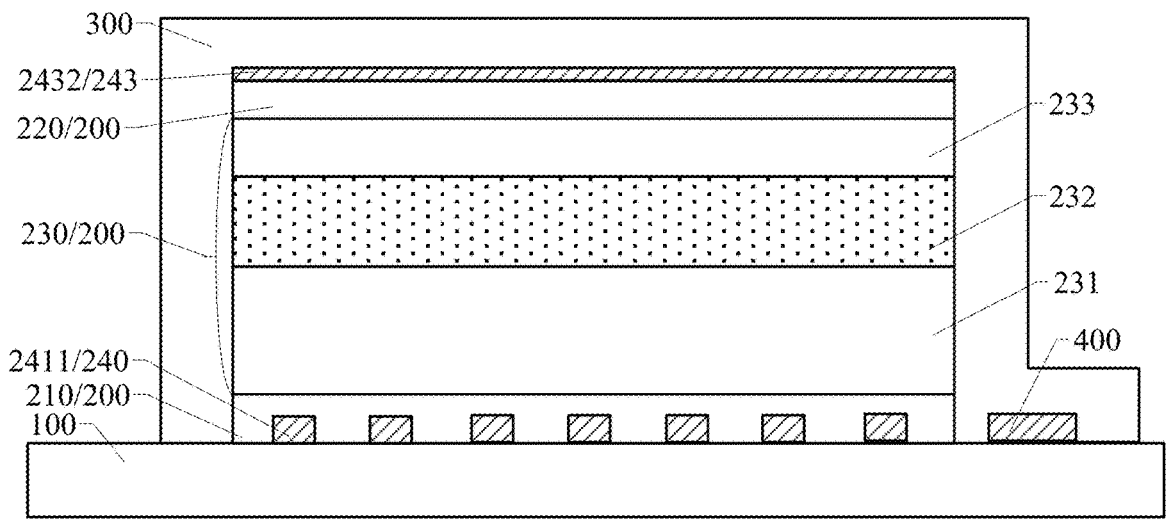
FIG. 22 is a schematic diagram of an electrochromic dimming structure provided by another example of the embodiment of the present disclosure.

FIG. 22 is a schematic diagram of an electrochromic dimming structure provided by another example of the embodiment of the present disclosure. The electrochromic dimming structure shown in FIG. 22 is different from the electrochromic dimming structure shown in FIG. 12 in that the structure of the metal electrode 240 is different.

In some examples, as shown in FIG. 22, the metal electrode 240 includes at least one of a metal grid electrode or a metal thin layer 243. The thickness of the metal thin layer 243 is in the range of 1-20 nanometers, and the metal thin layer 243 overlaps with the electrochromic layer 230 in the direction perpendicular to the substrate 100. For example, the thickness of the metal thin layer 243 is in the range of 2-10 nanometers. For example, the thickness of the metal thin layer 243 is in the range of 3-6 nanometers. For example, the thickness of the metal thin layer 243 is in the range of 4-9 nanometers. For example, the thickness of the metal thin layer 243 is in the range of 5-8 nanometers. For example, the thickness of the metal thin layer 243 is in the range of 7-15 nanometers. For example, the thickness of the metal thin layer 243 is in the range of 12-18 nanometers.

In some examples, as shown in FIG. 22, the metal electrode 240 includes a first metal grid electrode 2411 and a second metal thin layer 2432, the first metal grid electrode 2411 is located at one side of the first electrode layer 210 away from the second electrode layer 220 and is electrically connected with the first electrode layer 210, and the second metal thin layer 2432 is located at one side of the second electrode layer 220 away from the first electrode layer 210 and is electrically connected with the second electrode layer 220; the antenna structure 400 is disposed in the same layer as the first metal grid electrode 2411, and the thickness of the antenna structure 400 is greater than the thickness of the second metal thin layer 2432. For example, the antenna structure 400 can have the same features as any of the antenna structures 400 shown in FIGS. 15-17, and details will not be repeated here.

In the electrochromic dimming structure provided by the present disclosure, by setting the metal electrode at the side of the second electrode layer away from the first electrode layer as a metal thin layer, it is helpful to reflect sunlight while improving the conductive effect, for example, reflect the infrared band in the sunlight, so as to reduce the thermal effect and provide a better working environment for the electrochromic dimming structure; at the same time, the metal electrode at the side of the first electrode layer away from the second electrode layer is set as a metal grid electrode with a thickness greater than that of the metal thin layer, and the antenna structure manufactured with the metal grid electrode in the same step patterning process is set to be relatively thick and set as a solid structure, which is helpful to improve the radiation effect of the antenna structure.

For example, the first metal grid electrode shown in FIG. 22 can have the same features as the first metal grid electrode in the above examples, and details will not be repeated here.

For example, as shown in FIG. 22, at least 90% of the orthographic projection of the second electrode layer 220 on the substrate 100 overlaps with the orthographic projection of the second metal thin layer 2432 on the substrate 100. For example, more than 95% of the orthographic projection of the second electrode layer 220 on the substrate 100 overlaps with the orthographic projection of the second metal thin layer 2432 on the substrate 100. For example, the orthographic projection of the second electrode layer 220 on the substrate 100 completely overlaps with the orthographic projection of the second metal thin layer 2432 on the substrate 100.

For example, the first metal grid electrode shown in FIG. 22 can be the first metal grid electrode shown in FIGS. 9 and 10, that is, as shown in FIG. 13, a relatively thick metal grid formed by electroplating. In this case, the antenna structure and the first metal grid electrode can be formed in the same step patterning process, and the antenna structure can have a thick thickness, for example, greater than 1 micron.

Figure 23:
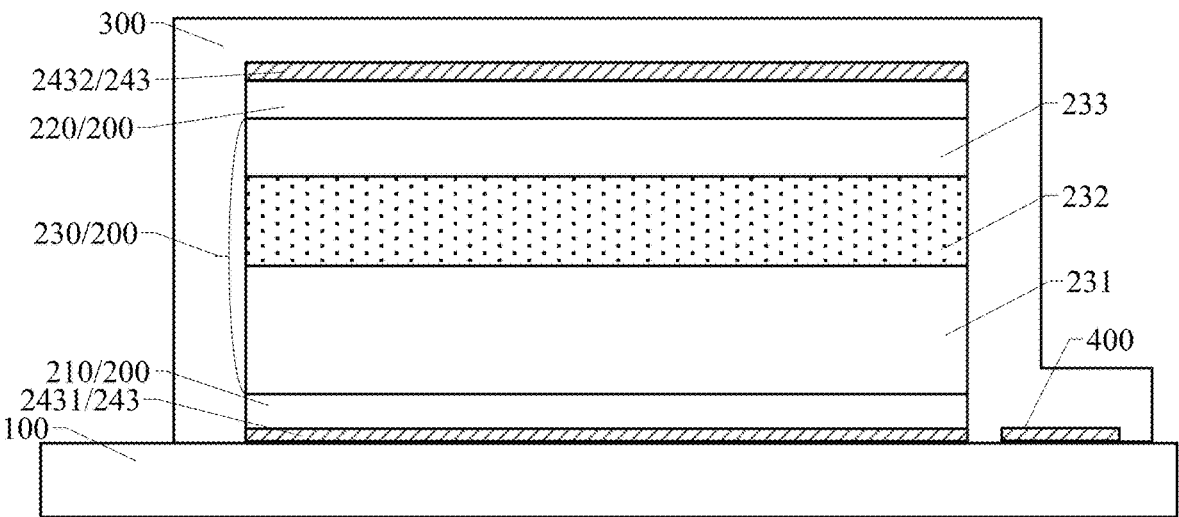
FIG. 23 is a schematic diagram of an electrochromic dimming structure provided by another example of the embodiment of the present disclosure.

FIG. 23 is a schematic diagram of an electrochromic dimming structure provided by another example of the embodiment of the present disclosure. The electrochromic dimming structure shown in FIG. 23 is different from the electrochromic dimming structure shown in FIG. 22 in that the structure of the metal electrode 240 is different.

In some examples, as shown in FIG. 23, at least 90% of the orthographic projection of the first electrode layer 210 on the substrate 100 overlaps with the orthographic projection of the metal thin layer 243 on the substrate 100. For example, more than 95% of the orthographic projection of the first electrode layer 210 on the substrate 100 overlaps with the orthographic projection of the metal thin layer 243 on the substrate 100. For example, the orthographic projection of the first electrode layer 210 on the substrate 100 completely overlaps with the orthographic projection of the metal thin layer 243 on the substrate 100.

In some examples, as shown in FIG. 23, the metal thin layer 243 includes a first metal thin layer 2431 and a second metal thin layer 2432, the first metal thin layer 2431 is located at one side of the first electrode layer 210 away from the second electrode layer 220 and is electrically connected with the first electrode layer 210, and the second metal thin layer 2432 is located at one side of the second electrode layer 220 away from the first electrode layer 210 and is electrically connected with the second electrode layer 220, and the antenna structure 400 is disposed in the same layer as one of the first metal thin layer 2431 and the second metal thin layer 2432. By setting the antenna structure and the metal electrode in the same layer, it is helpful to save space and reduce cost. FIG. 23 illustratively shows that the antenna structure 400 is in the same layer as the first metal thin layer 2431, but it is not limited thereto, and the antenna structure can also be disposed in the same layer as the second metal thin layer.

For example, as shown in FIG. 23, the thickness of the first metal thin layer 2431 is greater than the thickness of the second metal thin layer 2432, and the thickness of the antenna structure 400 is the same as the thickness of the first metal thin layer 2431, so as to increase the thickness of the antenna structure as much as possible and improve the radiation effect of the antenna structure.

The first metal thin layer or the first metal grid electrode in the electrochromic dimming structure shown in FIGS. 22 and 23 can be referred to as a first metal electrode, and the second metal thin layer in the electrochromic dimming structure shown in FIGS. 22 and 23 can be referred to as a second metal electrode. By setting the thickness of the antenna structure in the same layer as the first metal electrode to be greater than the thickness of the second metal electrode and setting the thickness of the antenna structure to be greater than the thickness of the first metal electrode, the thickness of the antenna structure can be increased as much as possible to improve the radiation effect of the antenna structure; the second metal electrode adopts the second metal thin layer, which is helpful to reflect more sunlight, reduce the heating effect of the infrared band of solar spectral energy on the electrochromic dimming structure, and improve the reliability and cycle characteristics of the electrochromic dimming structure.

The electrochromic devices in the above examples shown in the figures can be interchanged. For example, the second electrode layer having three film layers shown in FIG. 11 can be applied to the electrochromic dimming structure shown in FIGS. 22 to 23, so as to further reduce the heating effect of the infrared band of solar spectral energy on the electrochromic dimming structures.

The first metal grid electrode in the above examples shown in the figures can be applied to the electrochromic dimming structure shown in FIG. 22.

Figure 24:
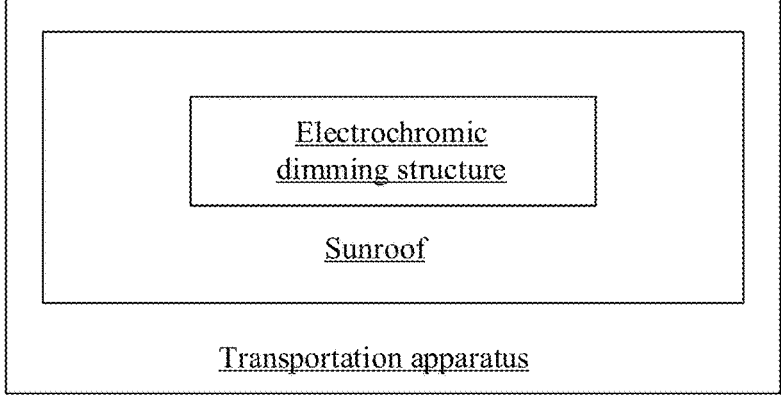
FIG. 24 is a schematic block diagram of a transportation apparatus.

Another embodiment of the present disclosure provides a transportation apparatus, and FIG. 24 is a schematic block diagram of the transportation apparatus. As shown in FIG. 24, the transportation apparatus includes a sunroof, and the sunroof includes any of the above electrochromic dimming structures.

For example, the transportation apparatus includes a groove for clamping the sunroof, and the antenna structure can be set as a solid and relatively thick structure and placed in the slot, which will not affect the light transmittance of the sunroof, but also greatly improve the radiation characteristics of the antenna structure.

For example, the first electrode layer is closer to the internal space of the transportation apparatus than the second electrode layer is.

For example, the transportation apparatus can be various appropriate means of transportation; for example, it can include a land transportation apparatus, such as various types of cars, etc., or it can be a water transportation apparatus, such as ships, etc.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. The protection scope of the present disclosure should be based on the protection scope of the claims.

The invention claimed is:

1. An electrochromic dimming structure, comprising:
a substrate;
an electrochromic device, located on the substrate, wherein the electrochromic device comprises a first electrode layer, an electrochromic layer and a second electrode layer which are sequentially stacked, the first electrode layer is located between the electrochromic layer and the substrate, both the first electrode layer and the second electrode layer are full-layer transparent electrode layers, and at least one of the first electrode layer or the second electrode layer comprises an oxide material;
a first protective layer, covering the electrochromic device;
wherein the electrochromic device further comprises a metal electrode located at at least one of a side of the first electrode layer away from the second electrode layer or a side of the second electrode layer away from the first electrode layer, and the metal electrode is electrically connected with at least one of the first electrode layer or the second electrode layer, and
the second electrode layer comprises a first film layer, a second film layer and a third film layer which are stacked, a material of the first film layer is the same as a material of the third film layer, a thickness ratio of the first film layer to the third film layer is in a range of 0.9-1.1, and a thickness of the second film layer is less than a thickness of the first film layer.

2. The electrochromic dimming structure according to claim 1, wherein the metal electrode comprises at least one of a metal grid electrode or a metal thin layer, and a thickness of the metal thin layer is in a range of 1-20 nanometers; and
the metal electrode overlaps with the electrochromic layer in a direction perpendicular to the substrate.

3. The electrochromic dimming structure according to claim 2, further comprising:
an antenna structure, disposed in the same layer as and separated from at least part of the metal electrode.

4. The electrochromic dimming structure according to claim 3, wherein the metal electrode comprises a first metal electrode and a second metal electrode, the first metal electrode is located at the side of the first electrode layer away from the second electrode layer and is electrically connected with the first electrode layer, and the second metal electrode is located at the side of the second electrode layer away from the first electrode layer and is electrically connected with the second electrode layer;

the antenna structure is disposed in the same layer as the first metal electrode, and a thickness of the antenna structure is greater than a thickness of the second metal electrode.

5. The electrochromic dimming structure according to claim 4, wherein the first metal electrode comprises a first metal grid electrode or a first metal thin layer, and the second metal electrode comprises a second metal thin layer.

6. The electrochromic dimming structure according to claim 3, wherein the metal grid electrode comprises a first metal grid electrode and a second metal grid electrode, the first metal grid electrode is located at the side of the first electrode layer away from the second electrode layer and is electrically connected with the first electrode layer, and the second metal grid electrode is located at the side of the second electrode layer away from the first electrode layer and is electrically connected with the second electrode layer;

an overlapping ratio of an orthographic projection of the first metal grid electrode on the substrate to an orthographic projection of the second metal grid electrode on the substrate is greater than 90%; and the antenna structure is disposed in the same layer as one of the first metal grid electrode and the second metal grid electrode.

7. The electrochromic dimming structure according to claim 3, wherein at least 90% of an orthographic projection of the first electrode layer on the substrate overlaps with an orthographic projection of the metal thin layer on the substrate;

the metal thin layer comprises a first metal thin layer and a second metal thin layer, the first metal thin layer is located at the side of the first electrode layer away from the second electrode layer and is electrically connected with the first electrode layer, and the second metal thin layer is located at the side of the second electrode layer away from the first electrode layer and is electrically connected with the second electrode layer; and the antenna structure is disposed in the same layer as one of the first metal thin layer and the second metal thin layer.

8. The electrochromic dimming structure according to claim 3, wherein the antenna structure comprises a solid structure, and the antenna structure does not overlap with the electrochromic layer in the direction perpendicular to the substrate.

9. The electrochromic dimming structure according to claim 5, wherein the antenna structure comprises a grid structure, and the antenna structure overlaps or does not overlap with the electrochromic layer in the direction perpendicular to the substrate.

10. The electrochromic dimming structure according to claim 3, wherein the antenna structure comprises a main body portion, a shape of the main body portion is an octagon, and an included angle between at least two adjacent sides of the octagon is 135 degrees.

11. The electrochromic dimming structure according to claim 9, wherein the antenna structure comprises a main body portion, the main body portion comprises the grid structure, the grid structure comprises a first strip portion extending along a first direction and a second strip portion extending along a second direction, and the first direction intersects with the second direction.

12. The electrochromic dimming structure according to claim 9, wherein the antenna structure comprises a main body portion, the main body portion comprises the grid structure, and the grid structure comprises a plurality of strip portions radially arranged starting from a point in a central region of the main body portion.

13. The electrochromic dimming structure according to claim 1, wherein a thickness of an electrode layer electrically connected with the metal electrode in the first electrode layer and the second electrode layer is in a range of 10 nm to 10 microns.

14. The electrochromic dimming structure according to claim 2, wherein a thickness of the metal grid electrode is in a range of 100-5000 nanometers, and a line width of the metal grid electrode is in a range of 1-5 microns.

15. The electrochromic dimming structure according to claim 6, further comprising:

a second protective layer, covering the second electrode layer;

wherein at least part of the second metal grid electrode and the antenna structure are located at one side of the second protective layer away from the substrate, the second protective layer comprises a groove configured to expose the second electrode layer, and the second metal grid electrode is electrically connected with the second electrode layer through the groove;

an electrode portion is further disposed at one side of the second protective layer away from the second electrode layer, and the electrode portion is electrically connected with the second metal grid electrode; and the first protective layer covers the second metal grid electrode and the antenna structure.

16. The electrochromic dimming structure according to claim 6, wherein the antenna structure is disposed in the same layer as the first metal grid electrode, and the first protective layer covers the antenna structure;

the first metal grid electrode comprises two metal layers, and a material of the antenna structure is the same as a material of one metal layer away from the substrate in the two metal layers.

17. The electrochromic dimming structure according to claim 1, wherein the electrochromic layer comprises an electrochromic material layer, an electrolyte layer and a storage layer which are sequentially stacked, and the electrochromic material layer is located between the electrolyte layer and the first electrode layer.

18. The electrochromic dimming structure according to claim 17, wherein the electrochromic material layer comprises one of an inorganic electrochromic material and an organic electrochromic material, and the electrolyte layer comprises one of a solid electrolyte and a liquid electrolyte.

19. A transportation apparatus, comprising a sunroof, wherein the sunroof comprises the electrochromic dimming structure according to claim 1.

20. An electrochromic dimming structure, comprising:

a substrate;

an electrochromic device, located on the substrate, wherein the electrochromic device comprises a first electrode layer, an electrochromic layer and a second electrode layer which are sequentially stacked, the first electrode layer is located between the electrochromic layer and the substrate, both the first electrode layer and the second electrode layer are full-layer transparent electrode layers, and at least one of the first electrode layer or the second electrode layer comprises an oxide material;

a first protective layer, covering the electrochromic device;

wherein the electrochromic device further comprises a metal electrode located at at least one of a side of the first electrode layer away from the second electrode layer or a side of the second electrode layer away from the first electrode layer, and the metal electrode is electrically connected with at least one of the first electrode layer or the second electrode layer;

the electrochromic dimming structure further comprises an antenna structure, the metal electrode comprises a metal grid electrode, and the metal electrode overlaps with the electrochromic layer in a direction perpendicular to the substrate;

the metal grid electrode comprises a first metal grid electrode and a second metal grid electrode, the first metal grid electrode is located at the side of the first electrode layer away from the second electrode layer and is electrically connected with the first electrode layer, and the second metal grid electrode is located at the side of the second electrode layer away from the first electrode layer and is electrically connected with the second electrode layer;

an overlapping ratio of an orthographic projection of the first metal grid electrode on the substrate to an orthographic projection of the second metal grid electrode on the substrate is greater than 90%; and the antenna structure is disposed in the same layer as one of the first metal grid electrode and the second metal grid electrode.

\* \* \* \* \*